United States Patent [19]

Shimada

[11] Patent Number: 4,862,289
[45] Date of Patent: Aug. 29, 1989

[54] PIXEL DENSITY VARIABLE IMAGE APPARATUS

[75] Inventor: Kazuyuki Shimada, Chofu, Japan

[73] Assignee: Ricoh Company, Ltd., Tokyo, Japan

[21] Appl. No.: 126,924

[22] Filed: Nov. 30, 1987

[30] Foreign Application Priority Data

Nov. 28, 1986 [JP] Japan .................................. 61-283666

[51] Int. Cl.$^4$ ........................ H04N 1/23; H04N 1/40; G01D 9/42
[52] U.S. Cl. .................................... 358/298; 358/296; 358/300; 358/456; 358/474; 346/108
[58] Field of Search ............... 358/300, 302, 296, 280, 358/282, 283, 285, 298; 346/108, 160

[56] References Cited

U.S. PATENT DOCUMENTS

| | | | |
|---|---|---|---|
| 4,012,585 | 3/1977 | Chen | 358/285 |
| 4,084,197 | 4/1978 | Starkweather | 358/300 |
| 4,586,089 | 4/1986 | Nakazato | 358/280 |

Primary Examiner—Clifford C. Shaw
Assistant Examiner—Scott A. Rogers
Attorney, Agent, or Firm—Cooper & Dunham

[57] ABSTRACT

A laser printer includes an optical scanning system for scanning a laser beam carrying image information to be written across a photosensitive member repetitively to thereby write an image on the photosensitive member. In the present laser printer, the frequency of a pixel clock is varied in accordance with the pixel density or line speed, thereby maintaining the light intensity of the laser beam in each pixel substantially at constant. Preferably, the optical scanning system includes a first optical system leading a laser beam emitted from a laser to a rotating polygon mirror and a second optical system for leading the laser beam deflected by the polygon mirror to a photosensitive drum, whereby a first light path defined by the first optical system and a second light path defined by the second optical system cross each other at different elevations at least partly.

11 Claims, 20 Drawing Sheets

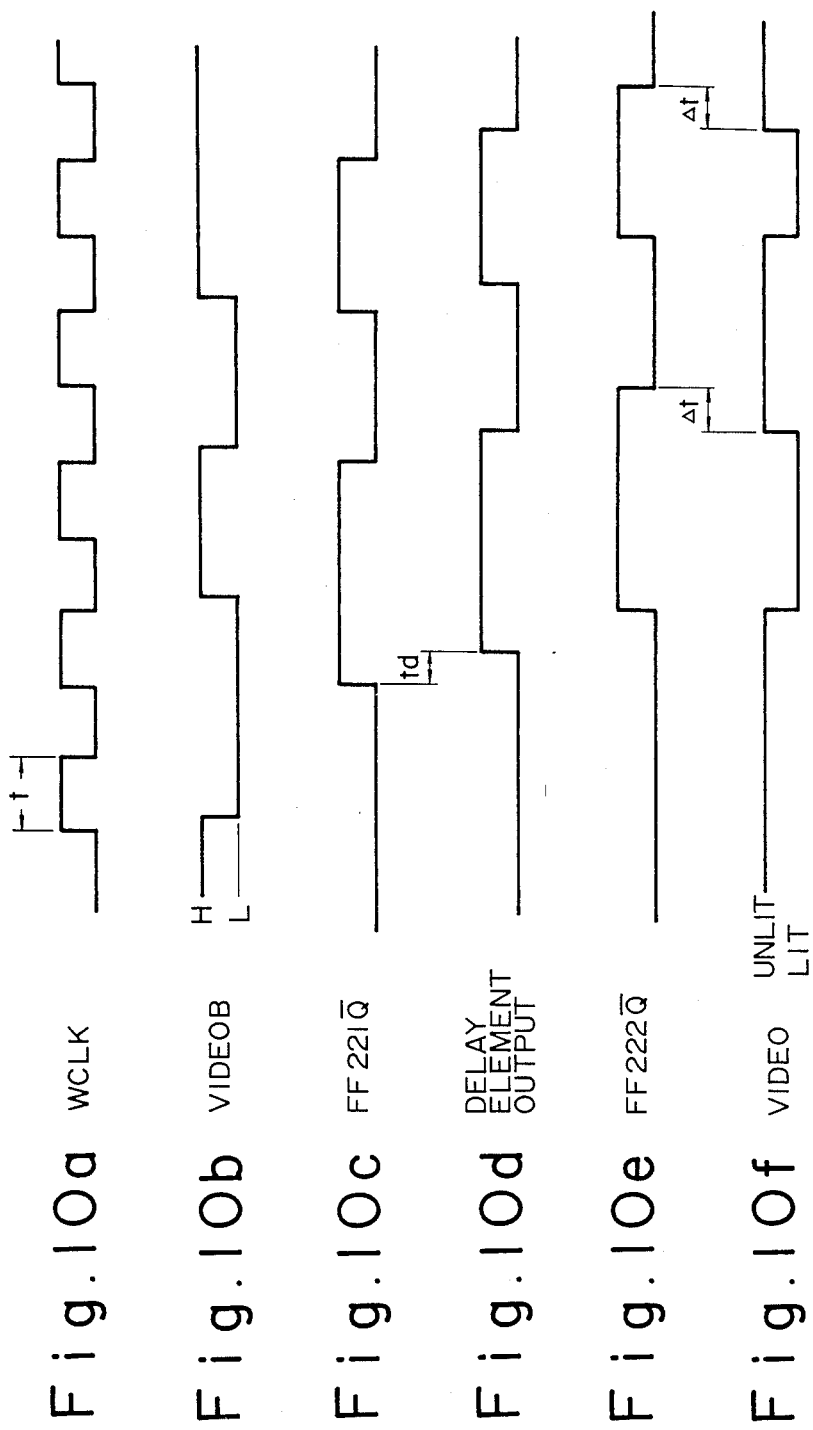

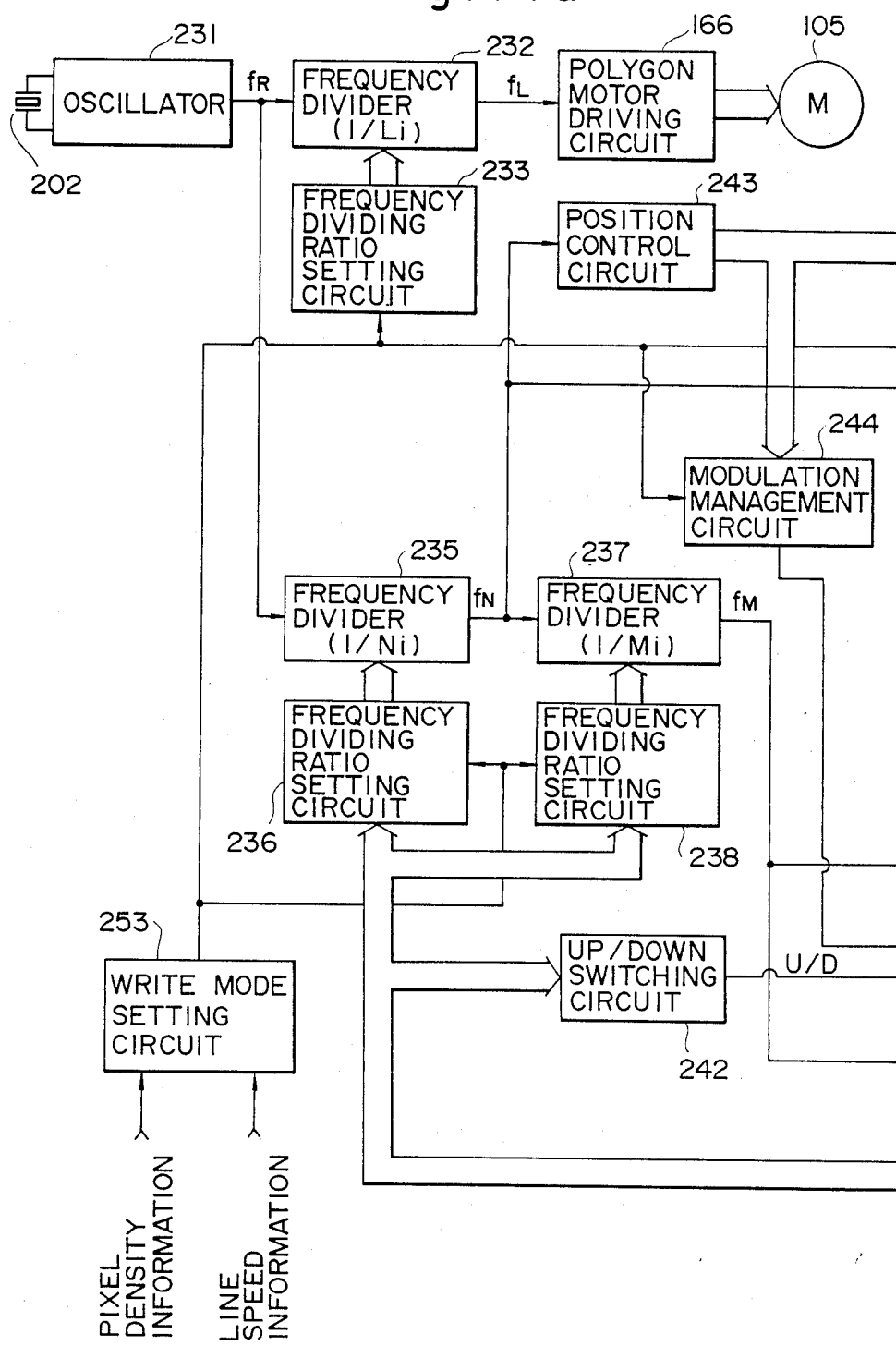

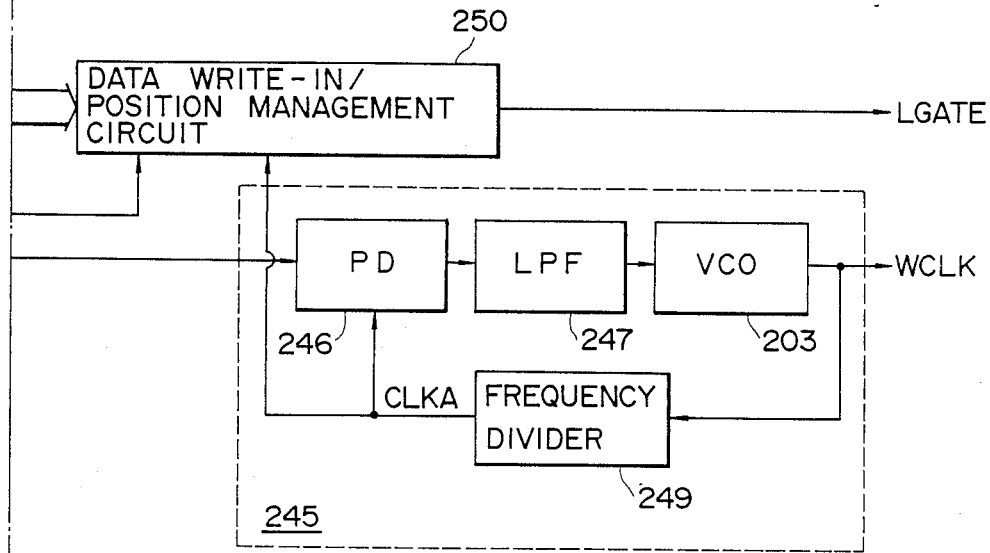
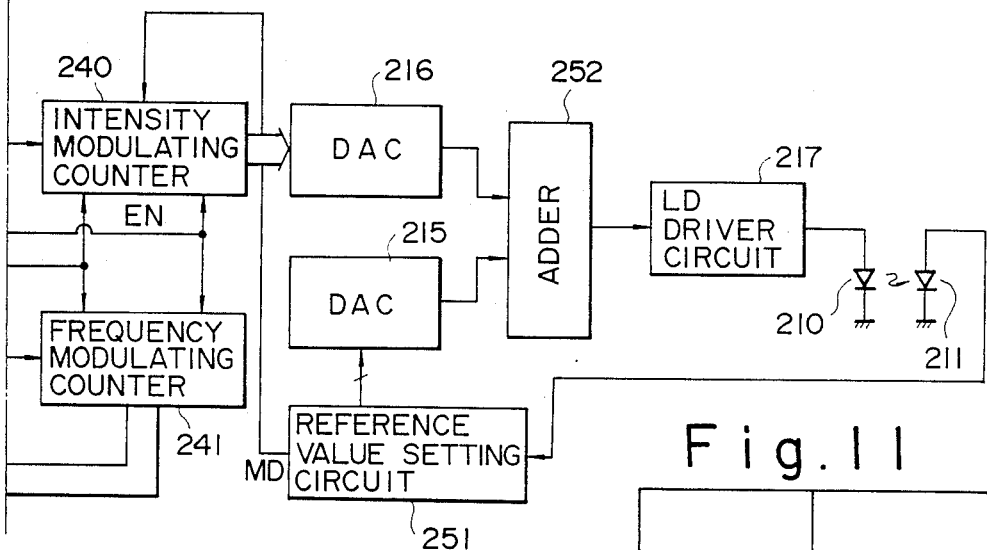

PIXEL DENSITY VARIABLE IMAGE APPARATUS

BACKGROUND OF THE INVENTION

1. Field of the Invention

This invention generally relates to an imaging apparatus using an optical scanning system, and, in particular, to an image forming apparatus, such as a laser printer, capable of varying a pixel density.

2. Description of the Prior Art

In general, in imaging apparatuses, such as electrophotographic copying machines, printers and facsimile machines, there are those which form an image on an imaging member, such as a photosensitive member, by scanning the imaging member with a light beam carrying image information to be recorded. However, in the prior art imaging apparatuses of this type, since the pixel density of an image to be recorded was fixed, image information having different pixel density could not be recorded properly.

SUMMARY OF THE INVENTION

In accordance with the principle of the present invention, there is provided an imaging apparatus for forming an image by scanning a light beam carrying image information to be recorded, which includes switching means for switching the pixel density in accordance with the pixel density of image information to be recorded.

It is therefore a primary object of the present invention to obviate the disadvantages of the prior art as described above and to provide an improved imaging apparatus.

Another object of the present invention is to provide an improved optical scanning type imaging apparatus, such as a laser printer.

A further object of the present invention is to provide an improved imaging apparatus capable of varying the pixel density in accordance with the pixel density of image information to be recorded.

A still further object of the present invention is to provide an improved imaging apparatus of the optical scanning type reliable in operation, high in performance, fast in operation and compact in size.

Other objects, advantages and novel features of the present invention will become apparent from the following detailed description of the invention when considered in conjunction with the accompanying drawings.

BRIEF DESCRIPTION OF THE DRAWINGS

FIGS. 10a through 10f are waveform diagrams which are useful for understanding the operation of the modulating circuit shown in FIG. 9;

FIG. 11 is an illustration showing how to combine FIGS. 11a and 11b;

FIGS. 11a and 11b, when combined as shown in FIG. 11, define a block diagram showing the internal structure of the write control IC provided in the light scanning system;

DESCRIPTION OF THE PREFERRED EMBODIMENTS

Figure 1:
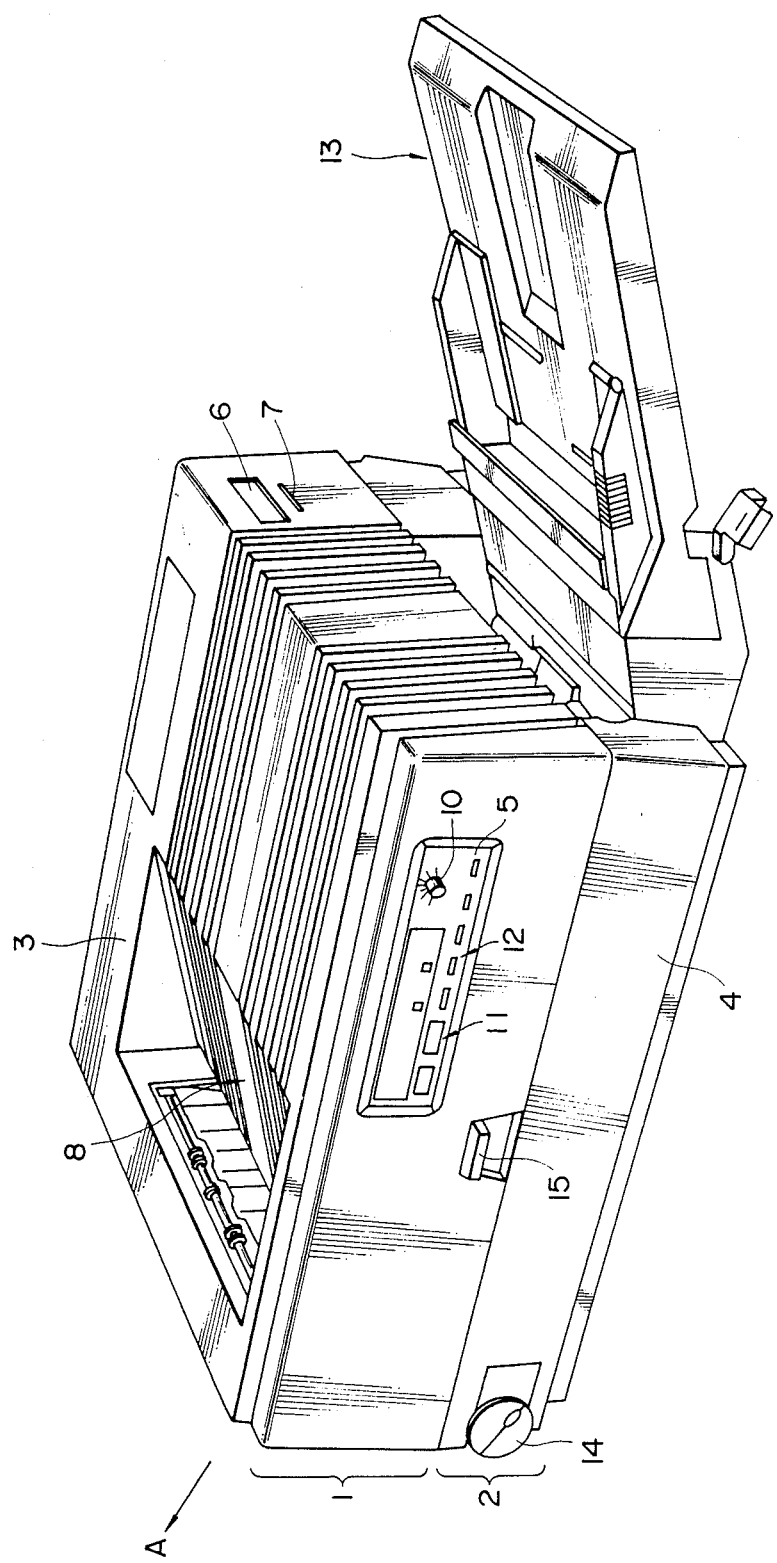
FIG. 1 is a schematic, perspective view showing a laser printer constructed in accordance with one embodiment of the present invention.

Referring now to FIG. 1, there is schematically shown a laser beam printer constructed in accordance with one embodiment of the present invention. As shown, the illustrated laser printer has a function of forming or printing an image on various types of recording medium, such as a sheet of paper, an envelope, based on image information and associated control information in the form of image information and character codes supplied from a host system, such as word-processor, personal computer, office computer, data processor, work station, image editing and processing apparatus or any other type of information processing apparatus. In the illustrated embodiment, the laser printer is generally divided into upper and lower units 1 and 2, respectively, and the upper unit 1 and lower unit 2 include an upper cover 3 and a lower cover 4, respectively. The upper cover 3 is provided with an operation panel 5 at its front side and also with a font cartridge insertion slot 6 and an emulation card insertion slot 7 at its right-hand side near the rear side. In addition, an upper paper receiving tray 8 for storing thereon sheets of paper discharged at a portion of top of the upper cover 3.

The operation panel 5 is provided with a rotary type paper size selection switch 10 for designating the size of sheet to be used, a group of switches 11 for providing various designations, and indicators 12, for example, comprised of light-emitting diodes, for indicating replacement of photosensitive member, various error statuses, such as paper end, jamming and toner end, and paper size selected. The font cartridge insertion slot 6 is provided for inserting therein a font cartridge provided with a RAM or ROM which stores character fonts, and the emulation card insertion slot 7 is provided for inserting an emulation card which implements a matching between the present printer and the host system to which the present printer is connected in accordance with the type of the host system.

Figure 2:
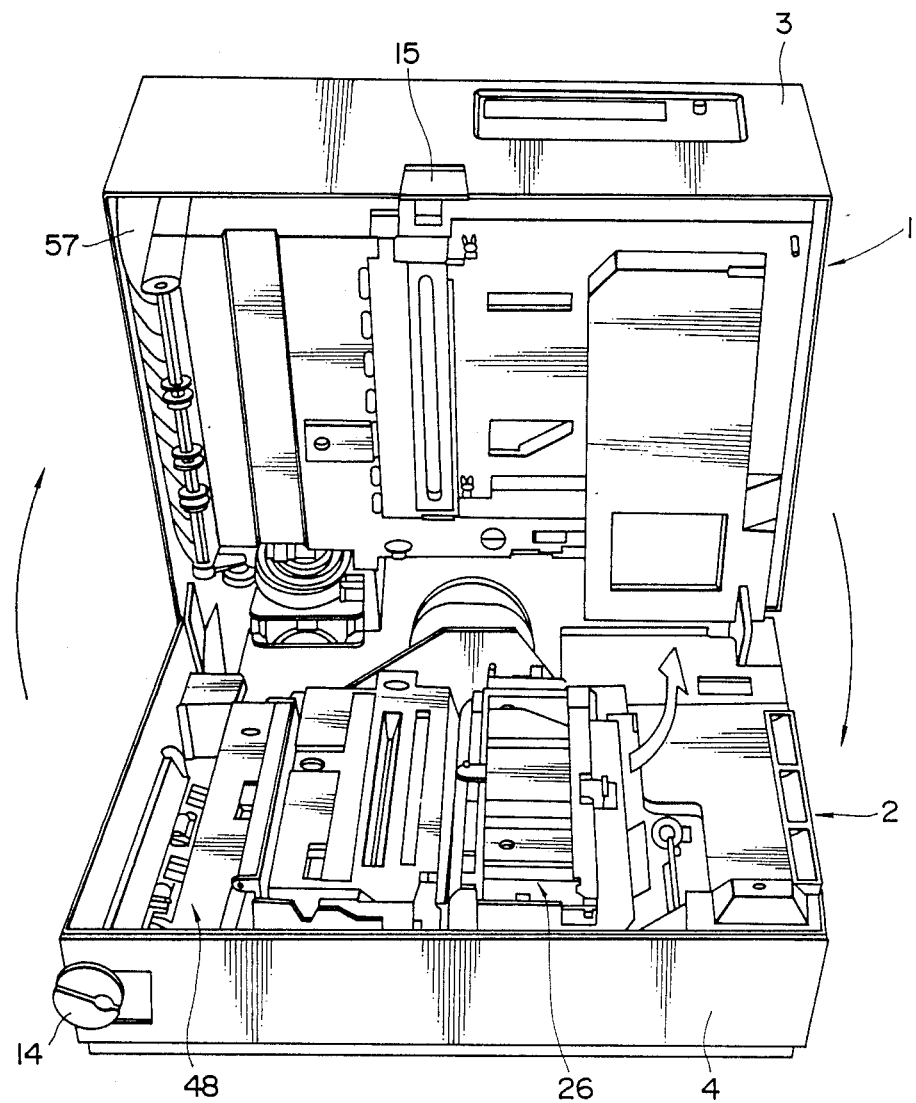
FIG. 2 is a schematic view of the laser printer of FIG. 1 with its upper unit pivotted open.

A paper supplying tray 13 for storing a stack of sheets of paper is detachably mounted on the bottom unit 2 at its right-hand side, and a paper discharge switching knob 14 is provided at the front side of the lower unit 2 at its left end for switching the paper discharging direction between the leftward direction of the printer, which is indicated by the arrow A, and the upper paper receiving tray 8. These upper and lower units 1 and 2 are hinged at their rear end and they are held together at their front sides by means of a lock mechanism (not shown). That is, the lock mechanism is released by depressing a lock lever knob 15, which projects forwardly from the front side of the upper cover 3, so that the upper unit 1 may be pivotted open with respect to the lower unit 2, as shown in FIG. 2. With the upper unit 1 kept open in this manner, maintenance operations and parts replacement operations can be carried out.

Figure 3:
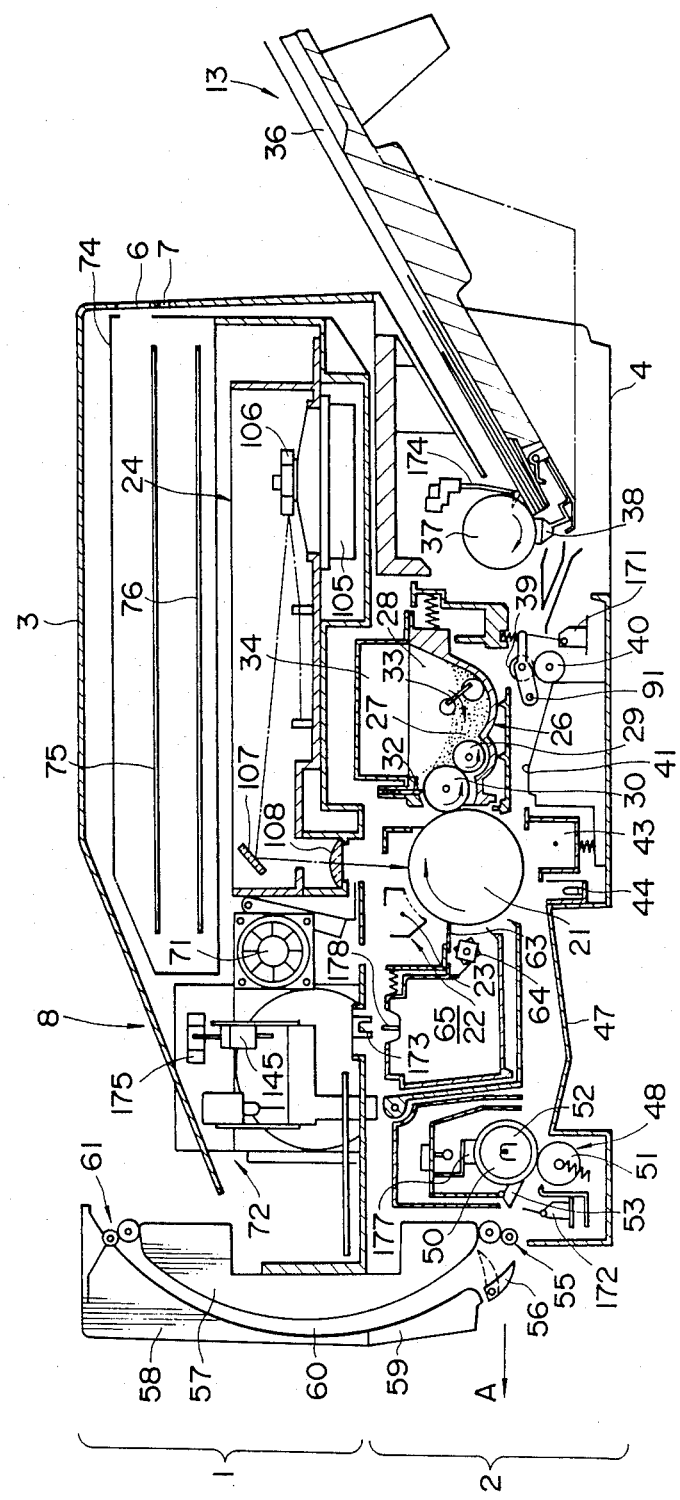
FIG. 3 is a schematic, cross-sectional view showing the internal structure of the laser printer of FIG. 1.

FIG. 3 illustrates the internal structure of the laser printer shown in FIGS. 1 and 2. As shown, the laser printer includes a drum-shaped photosensitive member 21 which is disposed approximately at the center of the lower unit 2 and which is driven to rotate in a predetermined direction indicated by the arrow at constant speed by means of a main motor (not shown) when a print start button has been depressed. As the photosensitive member 21 rotates, its peripheral surface is first uniformly charged by application of corona ions supplied from a corona wire 23 of a corona discharging device 22, which extends in parallel with the photosensitive member 21. As the photosensitive member 21 further rotates, a laser beam carrying image information to be written is supplied from a laser writing system 24 through a second cylindrical lens 108 onto the uniformly charged surface of the photosensitive member 21, whereby the uniform charge is selectively dissipated by the laser beam in accordance with the image information to form an electrostatic latent image on the photonsensitive member 21. In this case, the laser beam scans the phtosensitive member 21 in a main scanning direction (optical scanning direction), and the photosensitive member 21 rotates in the direction indicated by the arrow with respect to the laser beam to carry out an auxiliary scanning. That is, the auxiliary scanning direction is defined as a direction of relative movement between the laser beam and the photosensitive member 21 which is caused by the motion, rotation in the present example, of the photosensitive member.

As the photosensitive member 21 further rotates, the electrostatic latent image formed on the photosensitive member is brought to a developing station where a developing device 26 is disposed, so that toner is applied to the electrostatic latent image to develop the latent image, thereby forming a visible toner image. The developing device 26 includes a toner tank 28 for storing therein a quantity of toner 27, and a toner supplying roller 29 disposed inside of the toner tank 28 rotates in the direction indicated by the arrow to cause the toner 27 to be supplied to a developing roller 30. Thus, a film of toner regulated to a predetermined thickness by a toner film thickness regulating blade 32 is formed on the peripheral surface of the developing roller 30. Since the developing roller 30 rotates in the direction indicated by the arrow while keeping contact with the photosensitive member 21 at light pressure, the toner on the developing roller 30 is selectively supplied to the photosensitive member 21 in accordance with a charge pattern of the latent image formed on the photosensitive member 21. Thus, the illustrated developing device 26 is a developing device of the contact development type. The developing device 26 further includes an agitating plate 33 which stirs the toner 27 stored in the toner tank 28 and a toner cartridge 34 for replenishing the toner 27 into the toner tank 28 at the top.

On the other hand, a plurality of sheets of paper 36 are stored on the paper supplying tray 13 in the form of a stack and the top-most sheet of paper is separated from the stack by means of a paper feeding roller 37 which is driven to rotate in the direction indicated by the arrow and a friction pad 38 and fed into a nip between an upper transportation roller 39 and a lower transportation roller 40, so that the sheet of paper thus supplied is then transported toward an image transfer station by the upper and lower transportation rollers 39 and 40 as guided along a transportation surface 41. Then, the sheet of paper is brought into contact with the photosensitive member 21 at the image transfer station where a predetermined voltage is applied to an image transferring corona discharger 43 at a predetermined timing, so that the toner image formed on the photosensitive member 21 is transferred onto the sheet of paper. Immediately upon completion of this image transfer, a charge-removing lamp 44 comprised of a light-emitting diode and disposed downstream of the image transferring discharger 43 with respect to the direction of advancement of the sheet of paper applies irradiation to the sheet of paper and also to the photosensitive member 21 through the sheet of paper, thereby removing the remaining charge on the photosensitive member 21 and also on the sheet of paper, so that the sheet of paper can be separated from the photosensitive member by its own weight.

Thereafter, the sheet of paper separated from the photosensitive member 21 by its own weight is transported into an image fixing device through a transportation surface 47, so that the sheet of paper is fed in between a heating roller 50 and a pressure roller 51 of the image fixing device 48. The heating roller 50 is provided with a heater 52 as disposed therein so that the peripheral surface of the heating roller 50 is heated to a predetermined temperature, and the sheet of paper bearing thereon a transferred toner image is passed between the heating roller 51 and the pressure roller 51 under pressure with application of heat, so that the toner image becomes permanently fixed to the sheet of paper by fusing. Preferably, the heating roller 50 includes a surface layer formed from an electrically conductive material which may be a mixture of teflon and carbon. With the provision of such an electrically conductive surface layer, any charge remaining on the sheet of paper may be removed during image fixing process so that the sheet of paper may be properly discharged and stacked.

Then the sheet of paper is separated from the heating roller 50 by a separating pawl 53 and transported to a paper discharging roller 55. A paper discharging route switching pawl 56 is disposed downstream of the paper discharging roller 55. This paper discharging route switching pawl 56 is associated with the paper discharging route switching knob 14 shown in FIG. 1, so that the paper discharging route switching pawl 56 pivotally moves between the first position indicated by the solid line and the second position indicated by the dotted line depending on the direction of rotation of the paper discharging route switching knob 14. And, while the paper discharging route switching pawl 56 takes the first position indicated by the solid line, the sheet of paper discharged from the paper discharging roller 55 passes through a path 60 defined between an inner paper guide member 57 and a pair of outer paper guide members 57 and 58 and is then discharged by an upper paper discharging roller 61 out onto the upper paper receiving tray 8 as inverted upside down (face-down paper discharge). On the other hand, while the paper discharging route switching pawl 56 takes the second position indicated by the dotted line, the sheet of paper discharged from the paper discharging roller 55 is discharged out of the printer directly to the exterior in the direction indicated by the arrow A (face-up discharge).

Incidentally, either of the two paper discharging modes, i.e., face-down mode and face-up mode, may be selected as desired; however, the face-down mode, in which sheets of paper are stacked according to the page number, is suitable for plain paper and the face-up mode, in which sheets of paper are stacked according to the reverse of the page number, is suitable not only for plain paper but also for relatively thick paper, such as envelopes, which are relatively high in stiffness.

On the other hand, after image transfer, the photosensitive member 21 is cleaned by a cleaning blade 63 so that any toner remaining on the photosensitive member 21 is removed therefrom, thereby preparing the photosensitive member 21 ready for the next cycle of image forming process. Incidentally, the toner thus removed from the photosensitive member 21 is collected into a toner collection tank 65 by a toner collecting roller 64.

Figure 4:
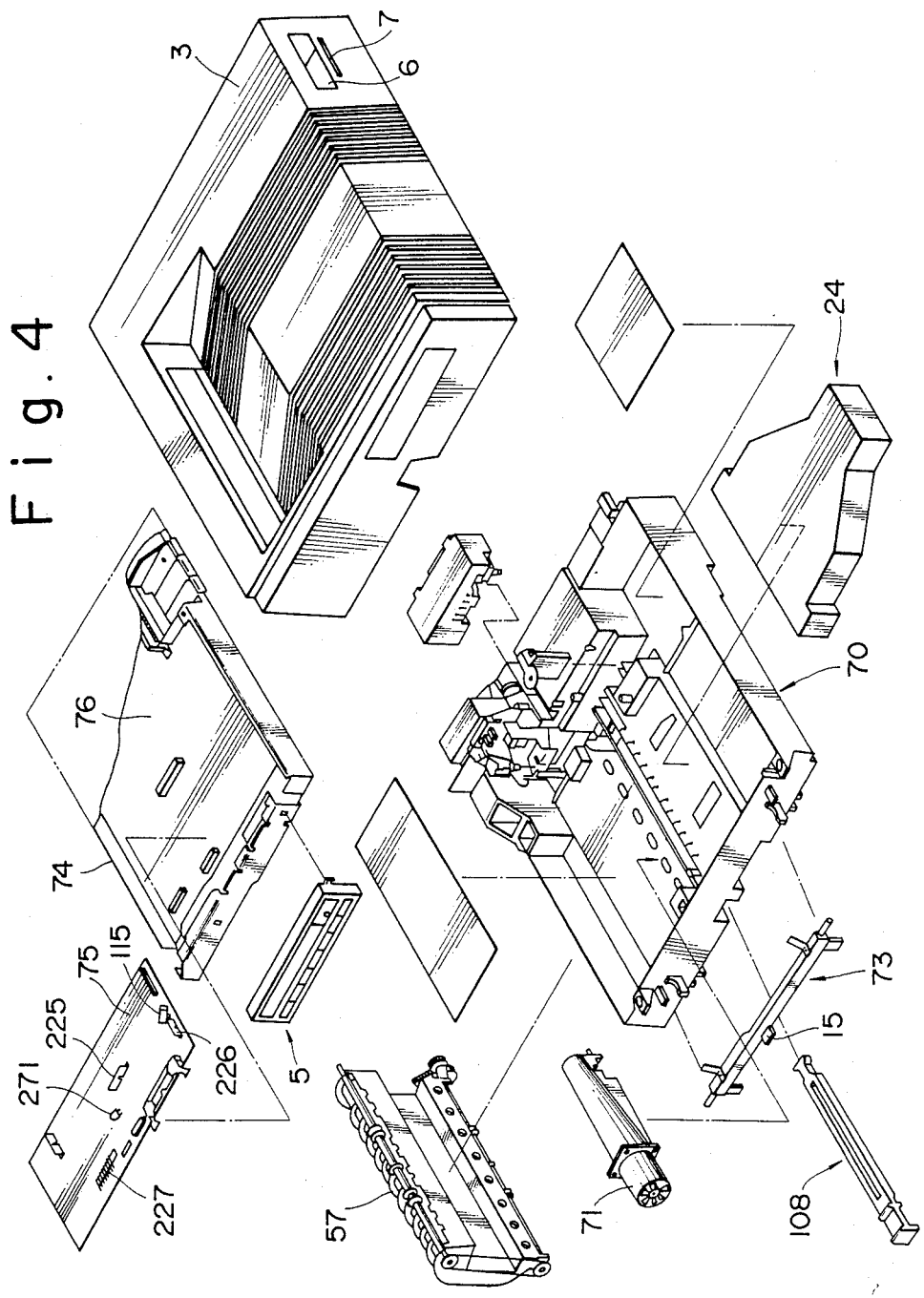
FIG. 4 is a schematic, exploded, perspective view showing the selected components of the laser printer of FIG. 1.

FIG. 4 is an exploded, perspective view of the selected components of the upper unit 1. Referring to FIGS. 3 and 4, the upper cover 3 of the upper unit 1 is provided with an upper unit frame 70 which, in turn, is provided at its bottom surface with the laser beam writing system 24, second cylindrical lens 108, ozone blowing fan 71 and suction fan unit 72, at its side surface near the front end with a lock lever 73, and at its front surface with a paper discharging guide member 57. The upper cover 3 of the upper unit 1 includes chassis 74 located above the upper unit frame 70, and on the chassis 74 is mounted a main controller board 75 provided with a main controller defining a control unit of the printer and a character control board 76 provided with a character controller.

Figure 5:
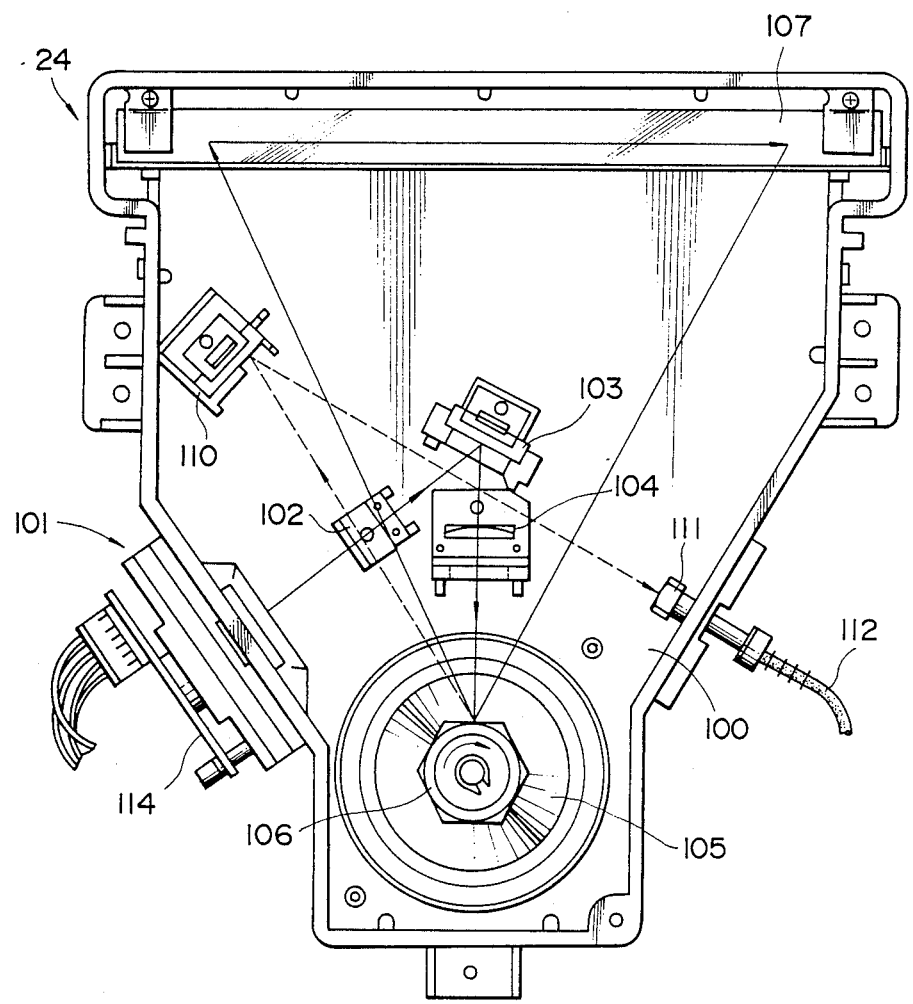
FIG. 5 is a schematic, plan view showing the light scanning system incorporated in the laser printer of FIG. 1.
Figure 6:
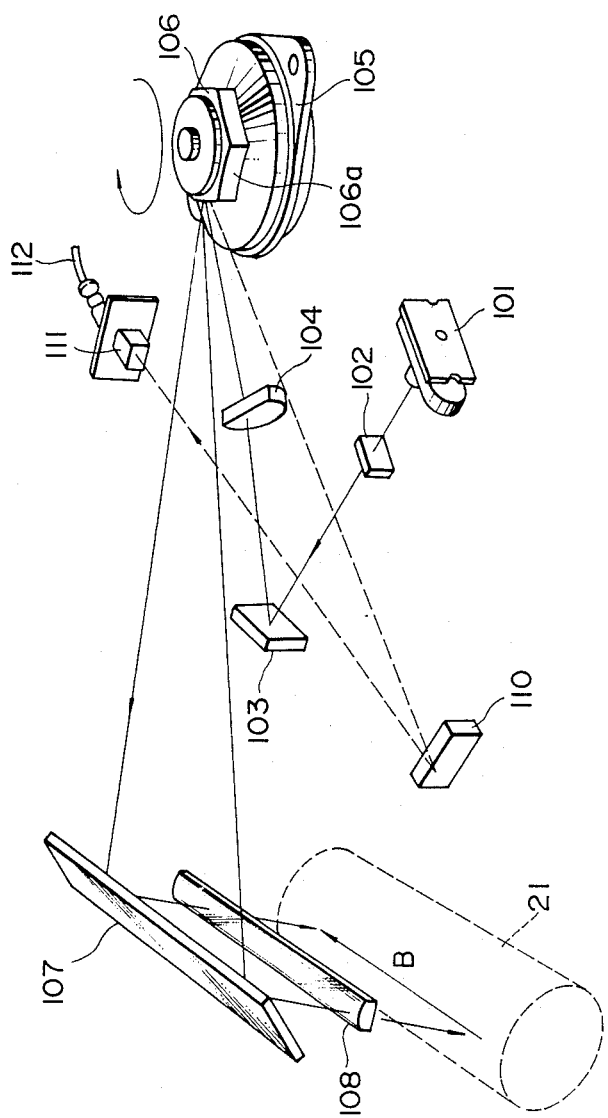
FIG. 6 is a schematic, perspective view showing the light scanning system shown in FIG. 5.

FIGS. 5 and 6 illustrate the laser beam writing system 24 in plan view and perspective view, respectively. The laser beam writing system 24 includes a laser diode (LD) unit 101 mounted on the side wall of a case 100 and a first cylindrical lens 102, a first mirror 103 and a spherical lens 104 which are mounted on the bottom wall of the case 100 approximately at the center thereof. A polygon motor 105 is mounted on the bottom wall of the case 100 at its rear end and a polygon mirror 106 is driven to rotate in the direction indicated by the arrow by the polygon motor 105. A second mirror 107 is disposed at the front side and a third mirror 110 is mounted on the side wall and a third cylindrical lens 111 is mounted on the side wall of the case 100 and an optical fiber 112 is operatively coupled to the third cylindrical lens 111.

The laser diode (LD) unit 101 includes a laser diode (LD), a collimator lens for collimating the divergent light flux emitted from the laser diode, and an aperture member for shaping the cross-sectional shape of the laser beam passing through the collimator lens such that it is longer in the optical scanning direction and shorter in the auxiliary scanning direction, which are integrally mounted on a printed circuit board 114. A portion of an automatic output control circuit (APC) for controlling the output of the laser diode is also defined on the printed circuit board 114. It is to be also noted that the laser diode (LD) is integrally formed with a monitoring photodiode for receiving a laser beam emitted rearwardly from the laser diode (LD).

The first cylindrical lens 102 serves to shape the laser beam emitted from the laser diode unit 101 in the auxiliary scanning direction on the photosensitive member 21. The spherical lens 104 makes the laser beam reflecting from the first mirror 103 to be convergent and also refracted approximately at 5° upwardly, so that the laser beam is caused to impinge upon a mirror surface 106a of the polygon mirror 106. Use is preferably made of a curved polygon mirror, each facet 106a of which is suitably curved, for the polygon mirror 106 so as to eliminate the necessity of providing a fθ lens which was conventionally disposed between the polygon mirror 106 and the second mirror 107. With this structure, there is provided a post objective type light deflecting system, in which a light deflector is disposed to deflect a light beam after making the light beam to be convergent. The second mirror 107 is so disposed to reflect the laser beam reflecting from the polygon mirror 106 onto the photosensitive member 21 for scanning.

Furthermore, the third mirror 110 is so disposed to be outside of the scanning region of the photosensitive member 21 by the laser beam reflected and deflected by the polygon mirror 106, and the third mirror 110 causes the incident light beam to be reflected toward the optical fiber 112. The optical fiber 112 has its opposite end connected to a fiber connector 115 mounted on the main control board 75 shown in FIG. 4, so that the laser beam reflected by the third mirror 110 passes through the third cylindrical lens 111 and propagates through the optical fiber 112 to be detected by a sync detector, typically comprised of a photodiode, mounted on the main control board 75. With these elements, a sync detecting mechanism for maintaining the scanning start position at constant is defined.

In this laser beam writing system 24, a laser beam carrying image information is emitted from the laser diode (LD) of the LD unit 101 and collimated by the collimator lens, and the collimated laser beam is then shaped when passing through the aperture member. Then, the laser beam emitted from the LD unit 101 passes through the first cylindrical lens 102, reflects at the first mirror 103, and is made convergent and at the same time refracted upwardly by the spherical lens 104 to thereby impinge upon the facet or mirror surface 106a of the polygon mirror 106. And, the laser beam reflected by the mirror surface 106a of the polygon mirror 106 is then reflected at the second mirror 107 and irradiated toward the photosensitive member 21 after passing through the second cylindrical lens 108. In this case, due to the rotation of the polygon mirror 106 in the direction indicated by the arrow, the laser beam scans the photosensitive member 21 in the optical or main scanning direction indicated by the arrow B. The optical scanning of the photosensitive member 21 by this laser beam in the main scanning direction is repetitively carried out by each of the mirror surfaces 106a of the polygon mirror 106. And, at the same time, since the photosensitive member 21 rotates in the auxiliary scanning direction normal to the main scanning direction, there is formed an electrostatic latent image in accordance with the image information carried by the laser beam on the photosensitive member 21.

The laser beam deflected by the polygon mirror 106 impinges upon the third mirror 110 prior to the initiation of each scanning of the photosensitive member 21 to be reflected into the optical fiber 112 through the third cylindrical lens 111 to be led into the sync detector mounted on the main control board 75, so that the timing of initiation of each optical scanning is controlled based on the result of this sync detection. In this manner, in the present laser beam writing system 24, the laser beam is emitted from the LD unit 101 toward the first mirror 103 located on the line extending between the center in the width direction of the photosensitive member 21 and the rotating axis of the polygon mirror 106, so that the laser beam is reflected by the first mirror 103 toward the rotating center or axis of the polygon mirror 106 and also refracted by the first mirror 103 upwardly. As a result, the laser beam is incident upon the facet or mirror surface 106a of the polygon mirror 106 obliquely from below, and, then, the laser beam reflected by the mirror surface 106a of the polygon mirror 106 is led toward the photosensitive member 21 as reflected by the second mirror 107. With this structure, the laser beam incident upon the polygon mirror 106 and the laser beam reflecting from the polygon mirror 106 cross each other at different levels without interference, so that the laser beam writing system can be made compact in size and high in accuracy.

Figure 7A:
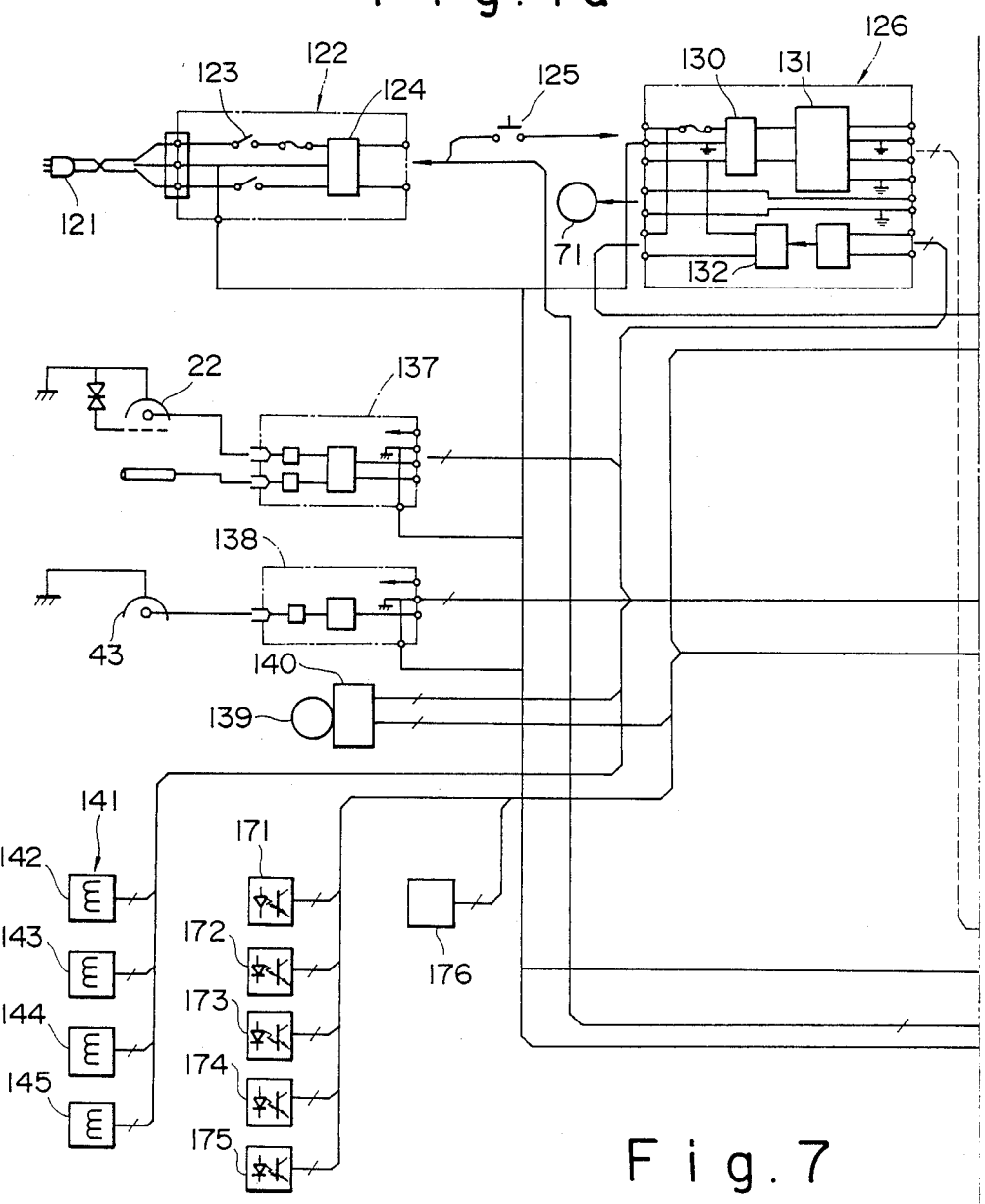
FIGS. 7a and 7b, when combined as shown in FIG. 7, define a schematic illustration showing the control system incorporated in the laser printer of FIG. 1.
Figure 7:
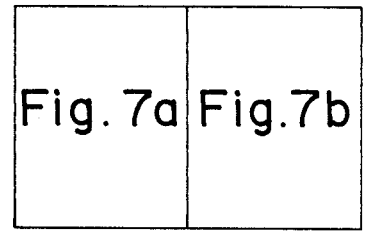
FIG. 7 is an illustration showing how to combine FIGS. 7a and 7b.
Figure 7B:
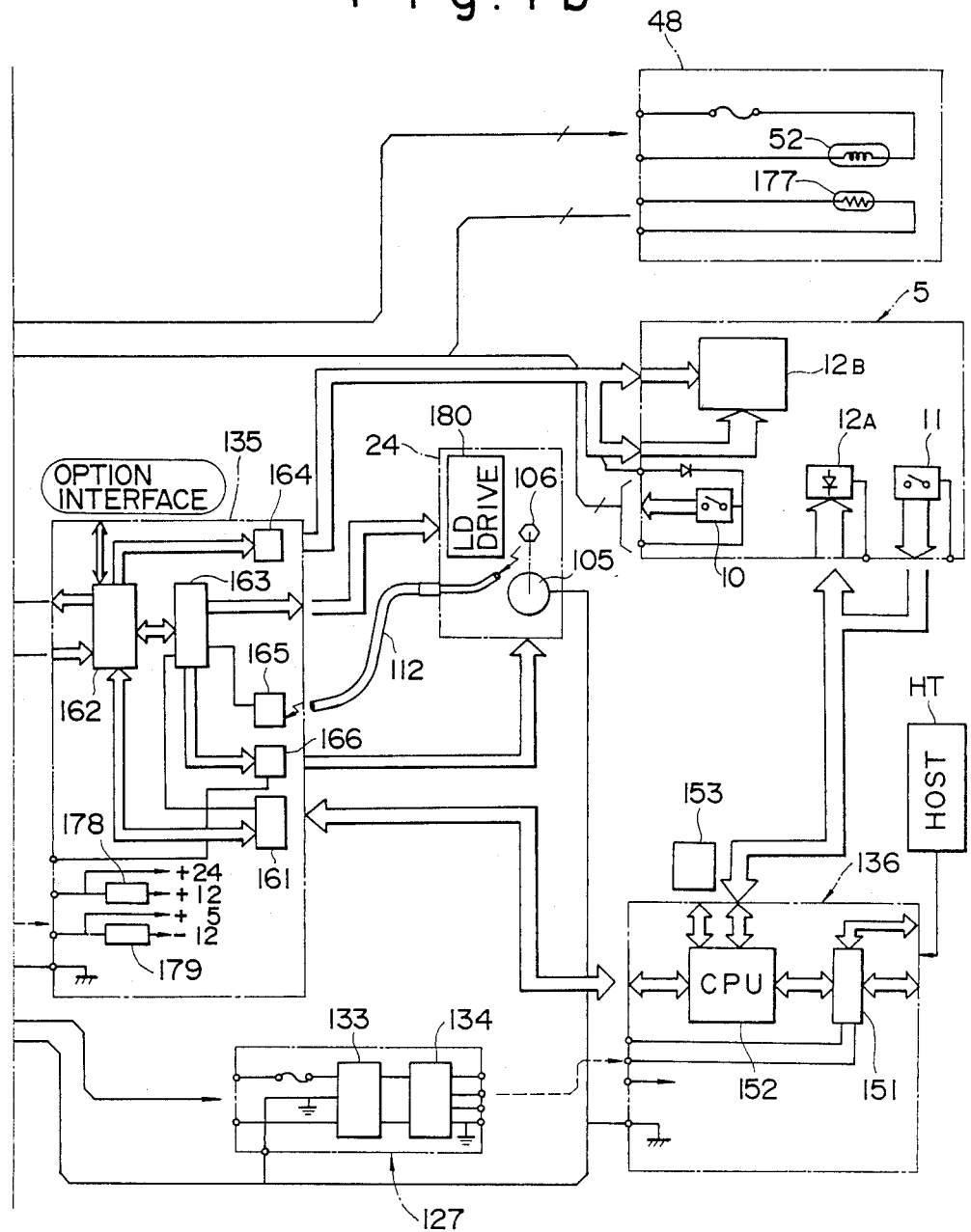

FIGS. 7a and 7b, when combined as illustrated in FIG. 7, show mostly in block form a control system of the present laser printer. The illustrated control system includes a power supply system which, in turn, includes an AC wall outlet 121, through which a commercial supply voltage is supplied to a power supply input section 122. The power supply input section 122 includes a main switch 123 and a noise filter 124 for eliminating noises in the supplied voltage. The power supply voltage is then supplied through an interlock switch 125 for rendering the main power supply disconnected when the upper unit 1 is pivotted open with respect to the lower unit 2 to a main controller power supply unit 126 and also to a character controller power supply unit 127.

The main controller power supply unit 126 includes a noise filter 130, a constant voltage circuit 131 for generating a constant voltage by subjecting the input voltage to AC/DC conversion, and a high-speed solid-state relay (SSR) 132 which serves as a switching element for controlling the on/off condition for supplying power to the heater 52 disposed inside of the heating roller 50 for controlling the image fixing temperature of the image fixing device 48. The character controller power supply unit 127, on the other hand, includes a noise filter 133 and a constant voltage circuit 134 for generating a constant voltage by subjecting the input voltage to AC/DC conversion.

And, the main controller power supply unit 126 supplies a power supply voltage to the main controller 135 formed on the main control board 75, to a charging-/developing power pack 137 for the charging corona unit 22 and for the developing bias, to an image transfer power pack 138 for the image transfer corona unit 43, to a main motor unit 140 including a driver for a main motor 139, a quartz oscillator for generating a reference signal for use in controlling a constant speed, an encoder, a power circuit and a servo circuit, a group of various operating units 141, to the ozone fan 71 and also to a suction fan which is not shown, and to the heater 52 of the image fixing device 48. On the other hand, the character control power supply unit 127 supplies a power supply voltage to a character controller 136 mounted on the character control board 76.

The group of various operating units 141 includes a paper supplying clutch 142 for controlling the rotation of the paper supply roller 37, a paper transportation clutch 143 for controlling the rotation of the lower transportation roller 40, a total count solenoid 144 for counting up the total count which indicates the number of prints, and a latching solenoid 145 provided on the suction fan unit 72.

Next, a detailed description will be had regarding the control system. The character controller 136 includes an interface 151 for interconnection with the host system HT and a microcomputer or CPU 152 including a ROM, RAM and I/0. The interface 151 takes care of reception of character information transmitted from the host system HT and of transmission of status information to the host system HT. The CPU 152 converts the character information received from the host system HT through the interface 151 to character font information using the font cartridge 153 mounted as inserted into the font cartridge insertion slot 6 or an internally provided font cartridge, and the thus converted character font information is supplied to the main controller 135. In addition, the designated information defined by the status of each of the switches 11 at the operation panel 5 is also input into the CPU 152 which controls which of indicators 12A of the indicator group 12 should be lit.

The main controller 135 includes a video interface 161 connected to the character controller 136, a microcomputer or CPU 162, a write control unit 163, a display driver 164, a sync detector circuit 165 and a polygon motor driver 166. The video interface 161 is in charge of receiving character font information from the character controller 136 and of transmission of a clock signal as a reference in control operation to the character controller 136. The CPU 162 is in charge of control of an image forming process, including uniform charging, image exposure, developing, image transfer, supply of paper, and image fixing. That is, under the control of CPU 162, based on the image clock (or pixel clock) from the write control unit 163, write data in accordance with the character font information received from the character controller 136 is recorded through the write control unit 163. On the other hand, through the display driver 164, the lighting condition of each of the indicators 12B of the indicator group 12 provided at the operation panel 5 is controlled, and the sheet size selection information from the sheet size selection switch 10 is supplied.

Furthermore, the CPU 162 is in charge of controlling the charging/developing power pack 137, the image transfer power pack 138, the main motor driver 140, the group of various operational units 141, and the image fixing control SSR 132. In addition, the CPU 162 also receives various detection information from a registration sensor 171, a paper discharging sensor 172, a toner over sensor 173, a paper end sensor 174, and a latch sensor 175, each of which is preferably comprised of a transmission type photosensor, also from a toner end sensor 176, which is preferably comprised of a microswitch, and also from an image fixing temperature sensor 177 which is preferably comprised of a thermister.

Described regarding the mounting position of each of these sensors referring again to FIG. 3, the registration sensor 171 is disposed upstream of the transportation rollers 39 and 40 with respect to the direction of advancement of a sheet of paper for detecting the fact that whether a sheet of paper has been fed in between the transportation rollers 39 and 40. And, based on the timing of detecting the presence of a sheet of paper by this registration sensor 171, the lower transportation roller 40 is controlled to start its operation. The paper discharging sensor 172 is disposed in the vicinity of the exit of the image fixing unit 48 so as to detect when a sheet of paper is discharged out of the image fixing unit 48. The toner over sensor 173 is to detect the condition when the toner collected in the toner collection tank 65 becomes excessive and it is disposed above a filler 178 which is provided at the top of the toner collection tank 65 and is moved upward when the toner collection tank 65 is fully filled with the collected toner. The paper end sensor 174 is disposed at the forward end of the paper supply tray 13 for detecting the presence or absence of sheets of paper on the paper supply tray 13. In addition, the latch sensor 175 is disposed above the latch solenoid 145 for detecting the operating condition of the latch solenoid 145. The toner end sensor 176 serves to detect the absence of toner in the toner storing tank 28 of the developing device 26. The image fixing temperature sensor 177 serves to detect the temperature at the surface of the heating roller 50 of the image fixing unit 48.

The write control unit 163 controls the laser diode LD of the laser writing system 24 through the LD driver circuit 180 based on write data from the video interface 161 to thereby cause a laser beam modulated with the write data to be emitted and also controls the timing of initiation of driving of the laser diode LD of the laser writing system 24 in accordance with a sync detection signal output from the sync detecting circuit 165 based on the laser beam received from the laser writing system 24 through the optical fiber 112. In addition, the write control unit 163 also controls the rotation of the polygon mirror 106 by controlling to drive the polygon motor 105 of the laser writing system 24 via the polygon motor driver 166. The main controller 135 is provided with a pair of voltage converter circuits 178 and 179 comprised of three-terminal regulators and DC/DC converters. Various voltages are generated by these voltage conversion circuits 178 and 179.

Figure 8A:
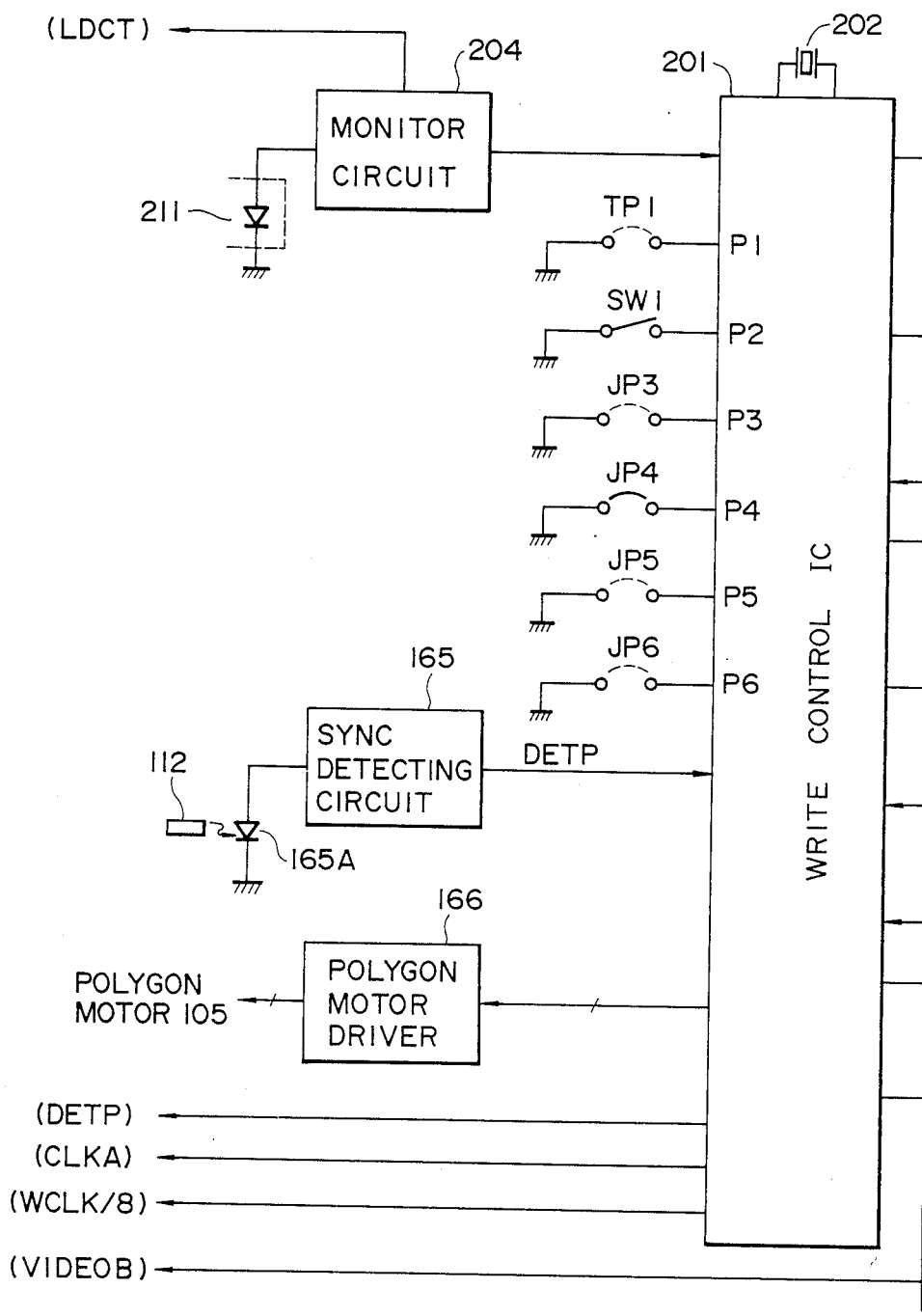
FIGS. 8a and 8b when combined as shown in FIG. 8, define a block diagram showing the write control unit of the control s of FIG. 7.
Figure 8B:
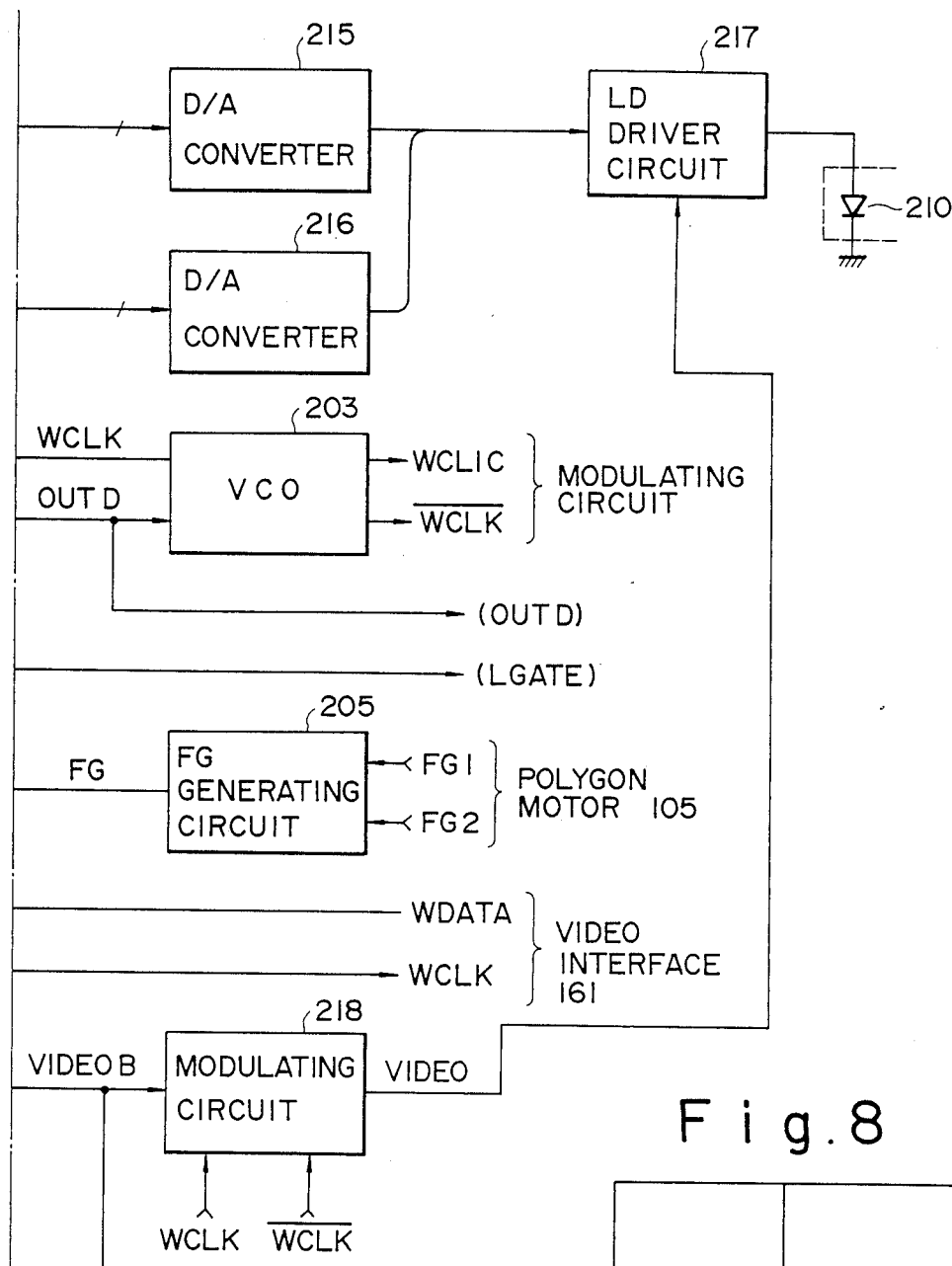
Figure 8:
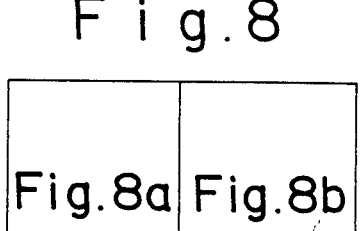
FIG. 8 is an illustration showing how to combine FIGS. 8a and 8b.
Figure 9:
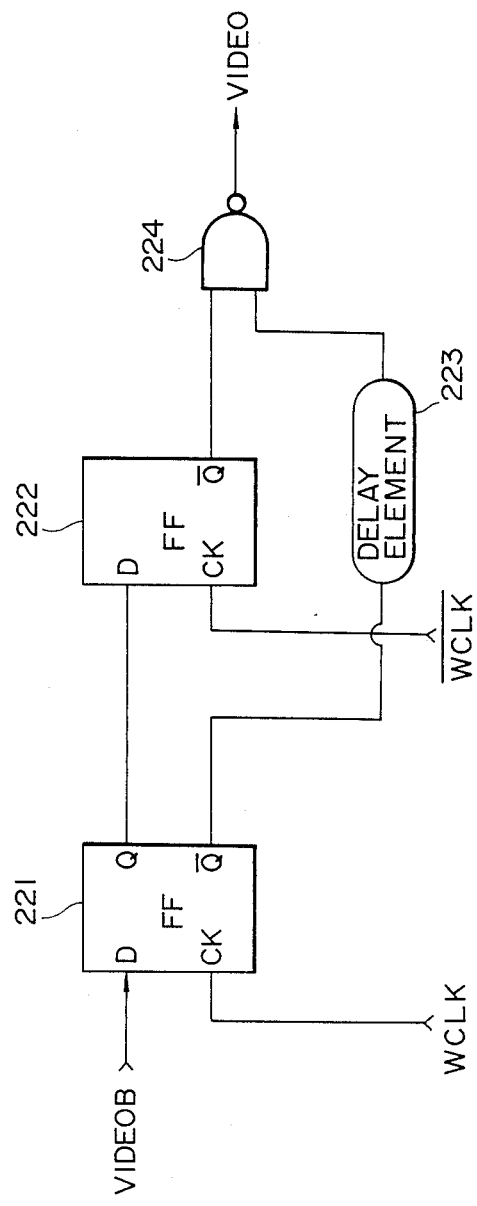
FIG. 9 is a schematic illustration showing the modulating circuit of the write control unit of FIGS. 8a and 8b.

FIGS. 8a and 8b, when combined as illustrated in FIG. 8, show in block form the write control unit 163 of this control unit. A write control IC 201 is a circuit in charge of the control relating to the laser writing system 24 in the form of a one-chip LSI and it is provided with a quartz oscillator 202 having the oscillation frequency of 20 MHz so as to generate the reference clock internally and receives a write data WDATA from the video interface 161. In addition, the write control IC 201 also receives such signal as a pixel clock (also referred to as image scanning clock, image clock or write clock) WCLK output from the voltage controlled oscillator (VCO) 203, which defines part of the pixel clock generating circuit, a sync detection signal DETP output from the sync detecting circuit 165, a monitor signal (which signal becomes a count mode switching signal for an internal up/down counter, as will be described later) output from a monitor circuit 204 which defines part of a reference value setting circuit for setting the intensity of light emitted from the laser diode (LD) 210 of the LD unit 101 at a reference value, and a feed-back signal FG from a feed-back signal generating circuit 205.

The voltage controlled oscillator (VCO) 203 generates the pixel clock WCLK having the frequency depending on a control voltage signal OUTD supplied from the write control IC 201 and supplies it to the control IC 201. In addition, the VCO 203 also generates an inverted pixel clock $\overline{WCLK}$. The sync detecting circuit 165 supplies a sync detection signal DETP to the write control IC 201 based on an output from the photodiode 165A which receives the sync detecting laser beam supplied from the laser writing system 24 through the optical fiber 112. The monitor circuit 204 supplies a monitor signal (up/down switching signal) to the control IC 201 based on an output from the monitoring photodiode 211 which receives the laser beam emitted rearwardly of the laser diode (LD) 210. The feed-back signal generating circuit 205 generates a feed-back signal FG based on feed-back signals FG1 and FG2 from the polygon mirror 105 and supplies it to the write control IC 201.

The write control IC 201 supplies the pixel clock WCKL from the voltage controlled oscillator (VCO) 203 to the video interface 161 so as to attain synchronization with transfer of data. In addition, the write control IC 201 also supplies a reference value data for controlling the intensity of the light emitted from the laser diode 210 to a reference value to a reference value D/A converter 215, which defines part of a power modulating circuit for controlling the intensity of the light to be emitted by the laser diode 210, and also supplies a correction data for correcting the intensity of the light to be emitted from the laser diode 210 in accordance with the scanning speed to the correcting D/A converter 216, which defines part of the power modulating circuit. In addition, a modulation data (image data) VIDOB according to write data WDATA is supplied to the modulating circuit 218, and a drive data is supplied to the polygon motor driver 166 to control the rotating speed of the polygon motor 105 and thus the scanning speed.

The pair of reference value D/A converter 215 and the correction A/D converter 216 converts the reference value data and the correction data supplied from the write control unit 201 into an analog reference value signal and a correction signal, respectively, by A/D conversion, and the thus converted reference value and correction signals are added to define a light intensity signal which is then supplied to a semiconductor laser (LD) driver circuit 217, driving the laser diode (LD) 210. Based on the modulation data VIDEOB from the write control circuit IC 201, the modulating circuit 218 generates a modulation signal VIDEO which is then supplied to the semiconductor laser driver circuit 217. The semiconductor laser driver circuit 217 supplies driver current in accordance with the light intensity signal from the reference value D/A converter 215 and the correction D/A converter 216 to the laser diode (LD) 210 and moreover controls the current to flow through the laser diode (LD) 210 turned on/off in accordance with the modulation signal VIDEO from the modulating circuit 218.

Now, one example of the modulating circuit 218 will be described with particular reference to FIGS. 9 and 10a through 10f. The illustrated modulating circuit 212 includes D-type flip-flops (also referred to as D-FF hereinafter) 221, 222, a delay element 223 and a NAND circuit 224. D-FF 221 receives a pixel data (modulation data) VIDEOB from the write control IC 201 at its input terminal D and also receives a pixel clock WCLK from the voltage controlled oscillator (VCO) 203 at its clock input terminal CK. D-FF 222 receives an output from the Q output terminal of D-FF 221 at its input terminal D and an inverted pixel clock $\overline{WCLK}$ from the voltage controlled oscillator (VCO) 203 at its clock terminal CK. The delay element 223 causes an output from the output terminal Q of D-FF 221 to be delayed by a predetermined delay time period td. This delay time period td is a time period which satisfies the condition of td being larger than 0 but smaller than t, wherein t indicates the pulse width of pixel clock WCLK. The NAND circuit 224 takes a logical product between the output from the $\overline{Q}$ output terminal of D-FF 222 and the output from the delay element 223 and converts it to output the modulation signal VIDEO.

Accordingly, in this modulation circuit 218, the pixel data (modulation data) VIDEOB shown in FIG. 10b is synchronized with the pixel clock WCLK shown in FIG. 10a by the D-FF 221 and delayed by a half of one clock pulse of the pixel clock WCLK (pulse width t) by the D-FF 222 and inverted, so that a signal shown in FIG. 10e is output from the output terminal $\overline{Q}$ of the DD-F 222 and input to the NAND circuit 224. On the other hand, the output from the output terminal $\overline{Q}$ of the D-FF 221, which is shown in FIG. 10c and which i a signal obtained by having the pixel clock WCLK synchronized with the image data (modulation data) VIDEOB and then having it inverted, is input into the delay element 223, so that it is delayed by the delay time period td as shown in FIG. 10d and input into the NAND circuit 224. Thus, the NAND circuit 224 takes a logical product between the output from the output terminal $\overline{Q}$ of the D-FF 222 and the output from the delay element 223 and causes the resulting product to be inverted, so that there is output a modulation signal VIDEO from the NAND circuit 224, whose lighting time period is shorter than the pixel data by a time period delta t, as shown in FIG. 10f.

With this structure, the on/off ratio of a light source (laser diode in the illustrated example) within one pixel in the case of realizing the constant writing speed by varying the frequency of pixel clock WCLK without using a f$\theta$ lens for optical scanning can be enhanced as will be described later. For example, if the period Tk of the pixel clock WCLK is to be varied in n steps from $T_l$ to $T_n$, assuming that the duty cycle of the pixel clock in each period is 50% and the pulse width tk= tk·½ (where k=1−n), the on/off ratio of the laser diode 210 can be given by the following equation.

$$Tk-(tk-td)/Tk=50\%+td/Tk.$$

For example, if $T_1$=400 ns and $T_n$=600 ns and the on/off ratio of 70% is to be realized in the laser diode 210, td=96 ns and the on/off ratio of the laser diode 210 in the range of $T_l-T_n$ is 70±4%, so that the on/off ratio increases in accuracy.

Returning to FIGS. 8a and 8b, the write control IC 201 has a terminal P1 which is connected to ground through a jumper JP1 for designating a pixel density. Depending on the presence or absence of this jumper JP1, the level supplied to the terminal P1 is used as pixel density information. That is, if the terminal P1 is connected to ground through the jumper JP1 so that the level at the terminal P1 is set at a low level "L", the pixel density is set, for example, at 240 DPI dots per inch); whereas, if the terminal P1 is disconnected from ground by removing the jumper JP1 to thereby set the level at the terminal P1 at a high level "H", the pixel density is set, for example, at 300 DPI. The pixel density may be switched between any other desired values, such as 180 DPI/200 DPI, 400 DPI/480 DPI, or any combination of these. Similarly, the write control IC 201 has a terminal P2 to which a switch SW1 for use in setting an output power of the laser diode 210 is connected. Moreover, the write control IC 201 has terminals P3 and P4 each of which may be connected to ground through jumpers JP3 and JP4, respectively, for designating the timing of initiation of operation for modulating the output of the laser diode 210 as will be described in detail later. In addition, the write control IC 201 has a terminal P5 which may be connected to ground through a jumper JP5 for designating the printing speed (line speed), and the level determined at the terminal P5 depending on the presence or absence of the jumper JP5 is used as line speed information. That is, for example, it may be so structured that if the level at the terminal P5 is set at the ground level, i.e., low level "L", by connecting the terminal P5 to ground by the jumper JP5, the line speed of 48 mm/sec is designated, and, if the level at the terminal P5 is set at a high level "H" by disconnecting the terminal P5 from ground by disconnecting the jumper JP5, the line speed of 36 mm/sec is designated. In addition, the write control IC 201 has a terminal P6 which may be connected to ground through a jumper JP6 for designating the pixel density in the main scanning direction, and depending on the presence or absence of the jumper line JP6, the level at the terminal P6 is set at either low level "L" or high level "H", so that the level set at the terminal P6 is used as the pixel density information in the main scanning direction.

Various output signals output from the write control unit 163, i.e., sync detection signal DETP from the write control IC 201, clock CLKA output from an internal frequency divider which defines a part of the pixel clock generating circuit (phase locked loop), clock WCLK/8 which is obtained by dividing the pixel clock WCLK by 8, modulation data (image data) VIDEOB, writing position (print start) signal LGATE, voltage signal OUTD for the voltage controlled oscillator 203 and a monitor output LDECT from the monitor circuit 204 are output in a group to the check connectors 225-227 provided on the main control board 75 shown in FIG. 4. The check can be carried out easily by connecting the check pins to the connectors.

FIGS. 11a and 11b, when combined as illustrated in FIG. 11, show in block form the detailed internal structure of the write control IC 201. As shown, there is provided an oscillator 231 which generates a reference clock $f_R$ having a frequency $f_O$ by a quartz oscillator 202. A frequency divider 232 divides the reference clock $f_R$ from the oscillator 231 by a ratio of division Li set by a frequency division ratio setting circuit 233 to output a clock $f_L$ having a frequency of $f_O/Li$. The polygon motor driver circuit (polygon motor driver) 166 drives the polygon motor 105 in accordance with the clock $f_L$ having the frequency $f_O/Li$ from the frequency divider 232 to thereby rotate the polygon mirror 106 at a predetermined speed.

The frequency divider 235 divides the reference clock $f_R$ from the oscillator 231 by the frequency division ratio Ni set by the frequency division ratio setting circuit 236 to thereby output a position control clock $f_N$ having the frequency $f_O/Ni$. The frequency division ratio setting circuit 236 sets the frequency division ratio Ni of the frequency divider 235 in accordance with the count value of a frequency modulating up/down counter 241 which will be described later. The frequency divider 237 divides the position control clock $f_N$ from the frequency divider 235 by the frequency division ratio Mi set by the frequency division ratio setting circuit 238 to thereby output a clock $f_M$ having the frequency $f_O/(Ni \cdot Mi)$. The frequency division ratio setting circuit 236 sets the frequency division ratio Mi of the frequency divider 237 in accordance with the count value of the frequency modulating up/down counter 241 which will be described later.

An intensity modulating up/down counter 240 upcounts or downcounts the clock $f_M$ from the frequency divider 237 in a mode of operation according to an up/down switching signal U/D form an up/down switching circuit 242, which will be described later, when it is set in an enable state by an enable signal EN from a modulating operation management circuit 244, which will be described later. And, the thus counted value is output to the correction D/A converter 216 as a correction data for correcting the intensity of the light emitted from the laser diode 210 in accordance with changes in the scanning speed. Furthermore, the intensity modulating up/down counter 240 sets the correction data to "0" when the mode setting signal from a reference value setting circuit 251, which will be described later, has been input.

The frequency modulating up/down counter 241 upcounts or downcounts the clock $f_M$ from the frequency divider 237 in a mode of operation according to the up/down switching signal U/D from the later-described up/down switching circuit 242 when it is set in an enable state by an enable signal EN from the later-described modulating operation management circuit 244, and the thus counted value is output to the frequency division ratio setting circuits 236, 238 and to the up/down switching circuit 242. The up/down switching circuit 242 outputs the up/down switching signal U/D for switching the count mode of the intensity modulating up/down counter 240 and the frequency modulating up/down counter 241 from the up mode to the down mode or from the down mode to the up mode in accordance with the count value of the frequency modulating up/down counter 241, i.e., in the vicinity of the extreme value in the scanning speed.

A position control counter 243 counts a position control clock $f_N$ from the frequency divider 235. The modulating operation management circuit 244 outputs an enable signal EN for setting the intensity modulating up/down counter 240 and the frequency modulating up/down counter 241 in an enable state at a predetermined timing based on the count value of the position control counter 243 and the sync detection signal DETP from the sync detection circuit 165 and setting them in a disable state upon completion of scanning. A phase locked loop (also referred to as PLL hereinafter) 245 includes a phase detecting circuit (PD) 246 which compares the phase between the position control clock $f_N$ from the frequency divider 235 and the clock CLKA from an internal frequency divider 249 and outputs its phase difference to a low pass filter (LPF) 247 as a pulse signal. LPF 247 allows the low frequency component of the pulse signal from the PD 246 and outputs to the voltage controlled oscillator 203 as a voltage signal OUTD. VCO 203 generates a clock having a frequency in accordance with the output voltage of the LPF 247 and outputs this clock as the pixel clock WCLK. The frequency divider 249 outputs a clock CLKA which is obtained by dividing the pixel clock WCLK from the VCO 203 by the frequency division ratio.

A data write position control circuit 250 outputs a write position signal (print start signal) LGATE based on the count value of the position control counter 243 and the clock CLKA from the PLL 245. A reference value setting circuit 251 outputs a reference value data for controlling the intensity of the light emitted from the laser diode 210 to a reference value in the reference D/A converter (DAC) 215 based on an output signal from the monitor photodiode 211. An adder 252 adds an analog correction signal from the D/A converter 216 and an analog reference value signal from the D/A converter 215 to output a light intensity signal to the laser diode (LD) driver circuit 217. Incidentally, the adder 252 is illustrated conceptually, and an added value between the correction signal and the reference signal can be obtained simply by connecting the output terminal of the D/A converter 216 and the output terminal of the D/A converter 215.

A write mode setting circuit 253 outputs write mode setting information to the frequency division ratio setting circuits 233, 236 and 238, the modulating operation management circuit 244 and the data write-in position management circuit 250 based on the pixel density information and the line speed information which have been input. The frequency division ratio setting circuit 233 switches the frequency division ratio Li in accordance with the write mode setting information. The frequency division ratio setting circuit 236 switches the switching mode of the frequency division ratio Ni in accordance with the write mode setting information. The frequency division ratio setting circuit 238 switches the switching mode of the frequency division ratio Mi in accordance with the write mode setting information. The modulating operation management circuit 244 switches the management mode of the modulating operation in accordance with the write mode setting information. The data write-in position management circuit 250 switches the initiation of writing in accordance with the write mode setting information.

Incidentally, the inputting of pixel density information and line speed information to the write mode setting circuit 253 is carried out depending on the presence or absence of the jumpers JP1 and JP5 in the present invention as described above; however, it may also be so structured that the inputting of these information can also be carried out by a switch, such as a DIP switch, by the CPU 162 or the host system, or by inputting information corresponding to the kind of the character font stored in the font cartridge 153 when it has been mounted in position.

Figure 12:
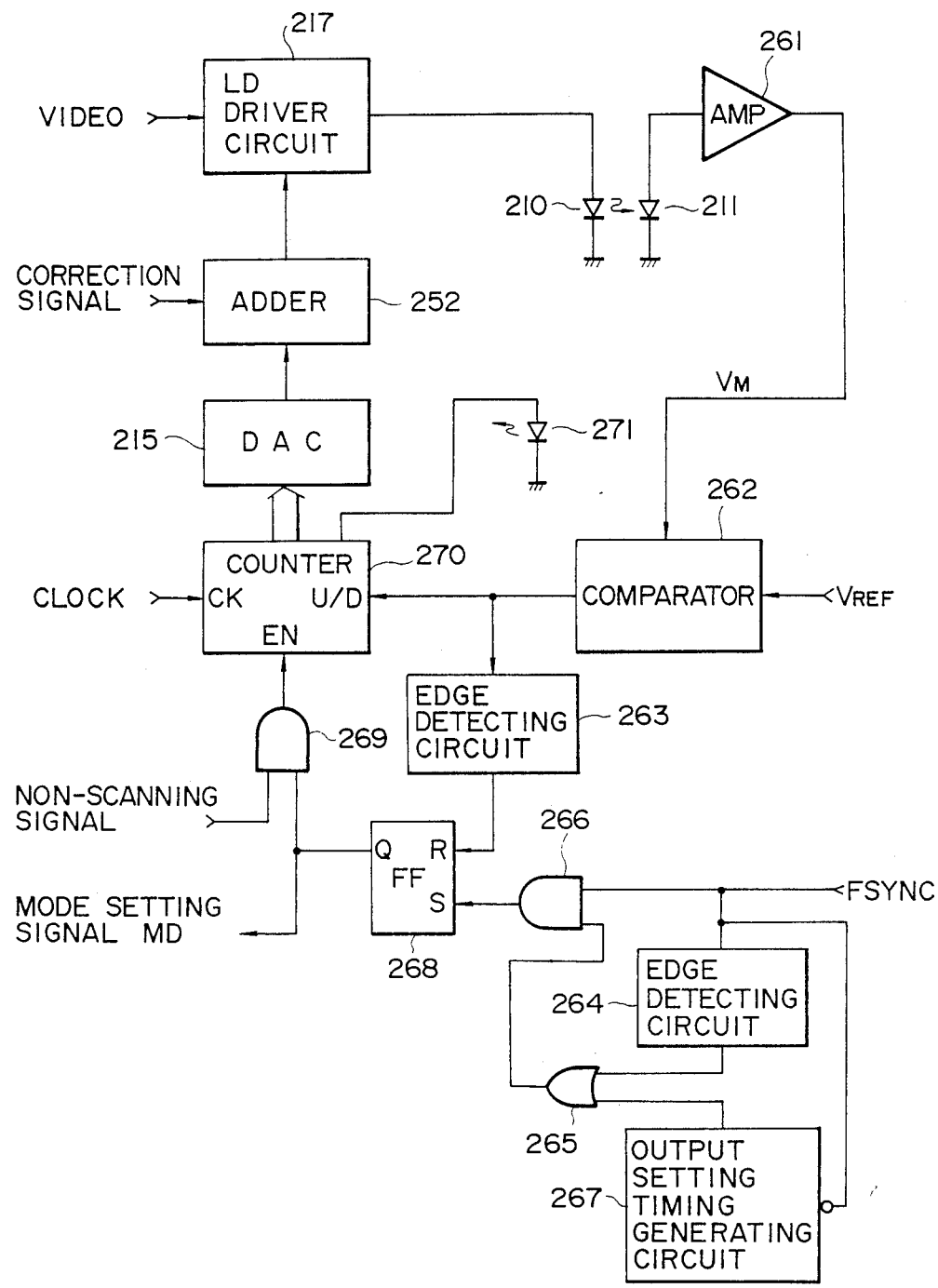
FIG. 12 is a block diagram showing the internal structure f the reference value setting circuit provided in the light scanning system.

FIG. 12 is a block diagram showing the reference value setting circuit 251. As shown, a comparator 262 compares a detection output from the monitor photodiode 211 with a reference value $V_{REF}$ and with the monitor voltage $V_M$ which has been obtained by amplifying the detection output from the monitor photodiode 211, and, then, according to the result of this comparison, outputs an up/down switching signal U/D to the up/down counter 270, whereby the up/down switching signal U/D indicates the upcount mode if $V_M$ is smaller than $V_{REF}$ and the downcount mode if $V_M$ is larger than or equal to $V_{REF}$. An edge detecting circuit 263 outputs a reset signal to the S-R flip-flop 268 when it has detected the rising (or falling) edge of the up/down switching signal U/D from the comparator 262. An edge detecting circuit 264 detects a rising edge of a frame sync signal FSYNC, and this detection signal is supplied to an AND circuit 266 through an OR circuit 265, where a logical product with the frame sync signal FSYNC is determined and output to a flip-flop 268 as a set signal. An output setting timing generating circuit 267 receives the frame sync signal SYNC to operate in the standby mode and output an output setting timing signal to the OR circuit 265 at a predetermined period.

The flip-flop 268 outputs a mode setting signal MD in accordance with its set/reset condition. The AND circuit 269 receives the mode setting signal from the flip-flop 268 and the non-scanning signal, determines a logical product of these signals and outputs an enable signal to the up/down counter 270. When set in an enable state by the output from the AND circuit 269, the up/down counter 270 upcounts or downcounts the clock in a count mode determined according to the up/down switching signal U/D from the comparator 262, and this count value is output to the D/A converter 215 as a reference value data. In addition, a carry/borrow singal from a carry/borrow terminal of the up/down counter 270 is applied to the light-emitting diode 271 so as to display the judgement of deterioration of the laser diode 210. The light-emitting diode 271 is provided on the main control board 75 as shown in FIG. 4.

Next, the operation of the above-described embodiment will be described in detail also referring to FIGS. 13 et seq.

In the case where use is made of the curved polygon mirror 106 having the curved mirror surface 106a without using a f$\theta$ lens as in the laser writing system 24 of the present printer, the scanning speed on the surface of the photosensitive member by a scanning light beam is not constant. In this case, the frequency $f_K$ of the pixel clock WCLK as a clock signal for turning on and off the scanning light beam is given by 1/T assuming that the time period assigned for writing one pixel is T. And, in the case where use is not made of a f$\theta$ lens, since the scanning speed on the surface of the photosensitive member by a scanning light beam is not at constant, if the frequency $f_K$ of the pixel clock WCLK were set at constant, a distortion would result in the written information.

Figure 13:
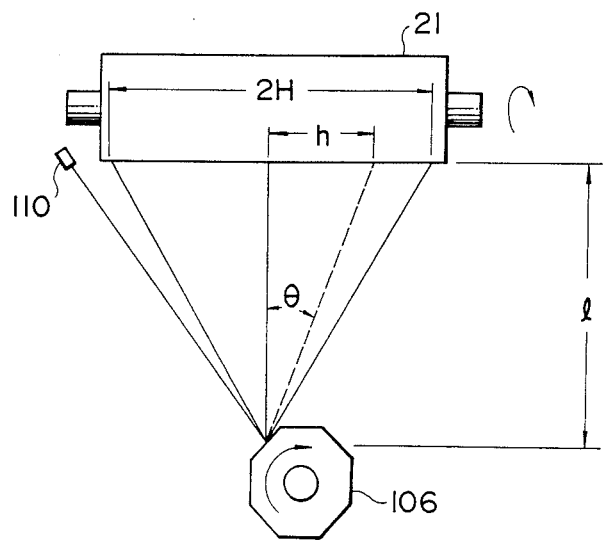
FIGS. 13 through 18 are schematic illustrations which are useful for understanding the operation of various components of the light scanning system.

Described more in detail with reference to FIG. 13, designating the angular velocity of the polygon mirror 106 by $w_O$ (constant), the angular velocity of the scanning light beam is $d\theta/dt = 2w_O = 2$ (constant). Thus, the scanning speed along a distance h on the surface of the photosensitive member 21, i.e., dh/dt, may be expressed by the following equation, designating the distance from the reflecting point on the polygon mirror 106 to the photosensitive member 21 by 1 and the angle defined by the distances 1 and h by $\theta$.

$$dh/dt = lw(1/\cos^2\theta)$$
$$= lw(1 + h^2/l^2)$$

Suppose that the width of the scanning region on the photosensitive member 21 is 2H and the relation of H+h=h' holds, the scanning speed dh/dt in the distance h on the photosensitive member 21 may be expressed as follows.

$$dh/dt = lw(1+(h'-H)^2/l^2)$$

Now, suppose that there are 2 m number of pixels within the width 2H of the scanning region, the scanning speed Vn at the nth pixel counted from the scanning start end, which is the left end of the scanning region, may be expressed by the following equation assuming that the width of one pixel is d.

$$Vn = ln(1+(nd-md)^2/l^2)$$

And, the frequency $f_K$ of the pixel clock WCLK may be expressed by the following equation since it is by definition equal to Vn/d.

$$f_K(n) = (lw/d)\ (1+(nd-md)^2/l^2) \quad (1)$$

Thus, if the frequency $f_K$ of the pixel clock WCLK is varied in accordance with the above equation (1) for each pixel, no distortion will be produced even if use is not made of a f$\theta$ lens.

Under the circumstances, with reference to FIG. 11, generation of the pixel clock WCLK and control of frequency $f_K$ will now be described.

In the first place, the reference clock $f_R$ having frequency $f_O$ from the oscillator 231 is divided by Ni by the frequency divider 235 to produce the position controlling clock $f_N$ having the frequency of $f_O/Ni$. This position controlling clock $f_R$ is applied to PLL 245, and the phase detecting circuit 246 of the PLL 245 supplies the voltage signal OUTD to the VCO 203 through the LPF 247 in accordance with a phase difference between the position controlling clock $f_N$ and the clock CLKA from the frequency divider 249. Then, the VCO 203 outputs the pixel clock WCLK having frequency $f_K$ in accordance with the voltage signal OUTD, and this pixel clock WCLK is subjected to frequency division at the frequency divider 249 whose output is supplied to the phase detecting circuit 246. In this case, the frequency $f_K$ of the pixel clock WCLK output from the VCO 203 remains unchanged if there is no difference in phase between the position controlling clock $f_N$ and clcock CLKA which are compared in phase by the phase detecting circuit 246 (equilibrium state of the PLL).

Under the condition, the position controlling clock $f_N$ has the frequency of $f_O/Ni$, and, under the equilibrium state, the clock CLKA also has the frequency of $f_O/Ni$. Thus, the frequency $f_K$ of the pixel clock WCLK output from the VCO 203 under the condition may be expressed by the following equation, designating the ratio of frequency division of the frequency divider 249 by M.

$$f_K = f\theta \cdot (1/Ni) \cdot M = f\theta \cdot M/Ni$$

Thus, by continuously changing the frequency division ratio Ni of the frequency divider 235 from $N_O$ to $N_p$, the frequency $f_K$ of the pixel clock WCLK also changes from $f_O \cdot M/N1$ to $f_O \cdot M/N_p$ continuously as well as monotonically. In this manner, by varying the frequency dividion ratio Ni of the frequency divider 235, the frequency $f_K$ of the pixel clock WCLK may be varied.

Under the condition, in the present embodiment, the scanning region is divided into K number of blocks BLi (i=1−K), and it is so structured that the frequency division ratio Ni is switched for the ith block each time when the position controlling clock $f_N$ has been counted to Mi based on a finite number of columns Mi (i=1−K) which has been previously determined during the write scanning. That is, if the initial value of the frequency division ratio Ni is $N_O$, the frequency of the position controlling clock $f_N$ is $f_O/N_O$, and, in the first block $BL_1$, when the position controlling clock $f_N$ has been counted to $M_1$, the frequency division ratio Ni is switched from $N_O$ to $N_1$, where $N_1=N_O +$ delta $N_1$. As a result, the frequency of the position controlling clock $f_N$ is switched to $f_O/N_1$. When the position controlling clock $f_N$ having the new frequency of $f_O/N_1$ has been counted to $M_1$, the frequency division ratio Ni is switched from $N_1$ to $N_2$, where $N_2=N_1 +$ delta $N_1$. This operation is repetitively carried out for a predetermined number of time $n_1$ for the first block $BL_1$, and, then, in the second block $BL_2$, the operation for switching the frequency division ratio Ni is carried out for a predetermined $n_2$ number of times each time when the position controlling clock $f_N$ has counted to $M_2$. In this manner, in the nth block BLn, the frequency division ratio Ni is switched up to ni times each time when the position controlling clock $f_N$ has counted to Mi.

Described this process more in detail with reference to FIGS. 11a and 11b, the position controlling clock $f_N$ output from the frequency divider 235 is subjected to frequency division by the frequency divider 237 at the frequency division ratio Mi. That is, upon counting of the position controlling clock $f_N$ to count Mi, one clock Mi is output from the frequency divider 237. In this case, if an enable signal EN is output from the modulating operation management circuit 244 and thus the frequency modulating up/down counter 241 is in an enable state, the frequency modulating up/down counter 241 counts the clock $f_M$ from the frequency divider 237 in the count mode designated by the up/down switching circuit 242, and this count value is supplied to the frequency division ratio setting circuits 236 and 238 and also to the up/down switching circuit 242.

Every time when the count value of the frequency modulating up/down counter 241 changes by "1", the frequency division ratio setting circuit 236 changes the frequency division ratio Ni by a change amount delta Ni. It is to be noted that in the present embodiment the change amount delta Ni of the frequency division ratio Ni in each block BLi is set at constant, tis may vary from one block from another. In addition, the frequency division ratio setting circuit 238 changes the frequency division ratio Mi by a change amount delta Mi every time when the count value of the frequency modulating up/down counter 241 has reached the number ni for switching of the frequency division ratio Ni determined for each block BLi. Moreover, the up/down switching circuit 242 outputs an up/down switching signal U/D for switching from the upcount mode to the downcount mode or from the downcount mode to the upcount mode every time when the count value of the frequency modulating up/down counter 241 has reached the vicinity of the limit value of the scanning speed.

Figure 14:
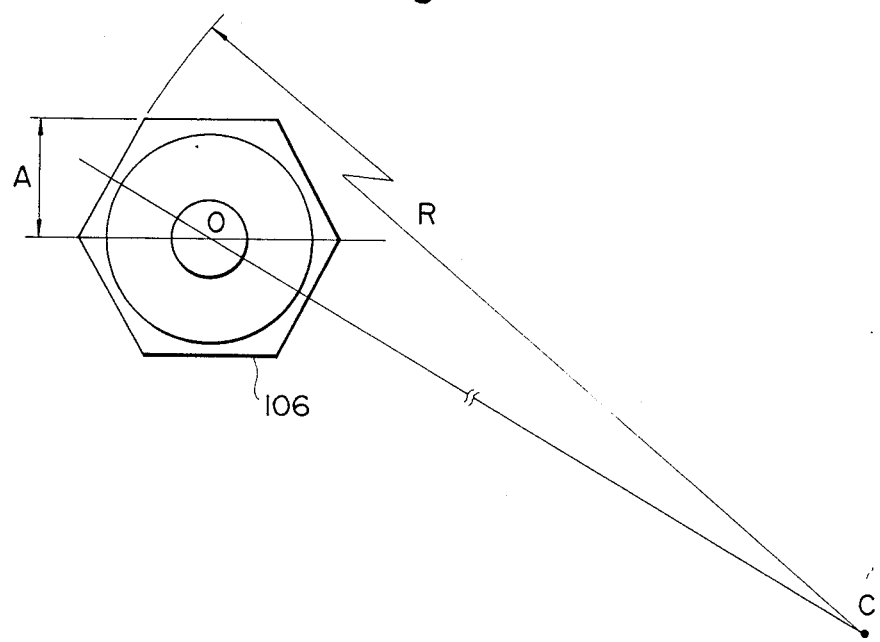
Figure 15:
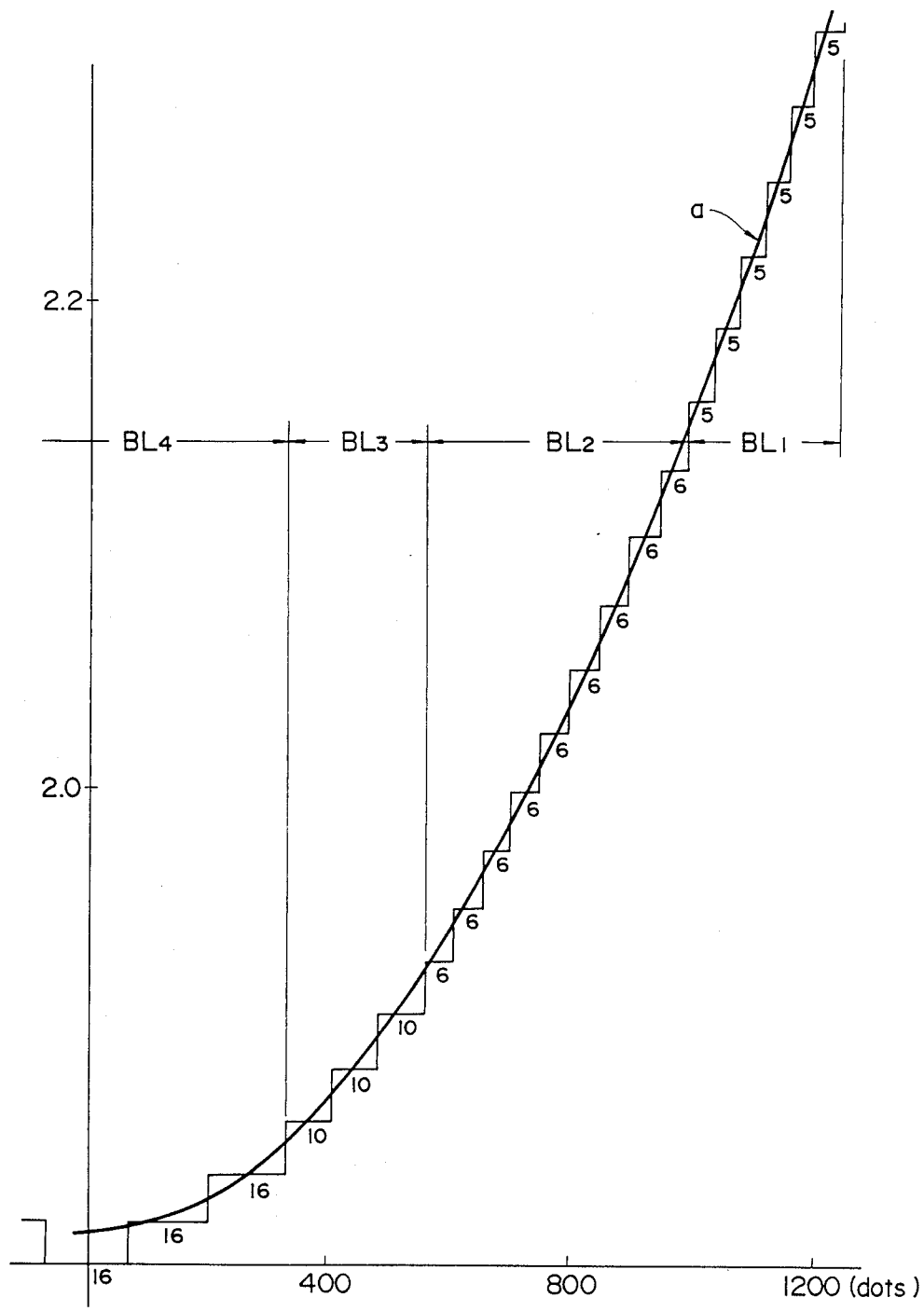
Figure 16:
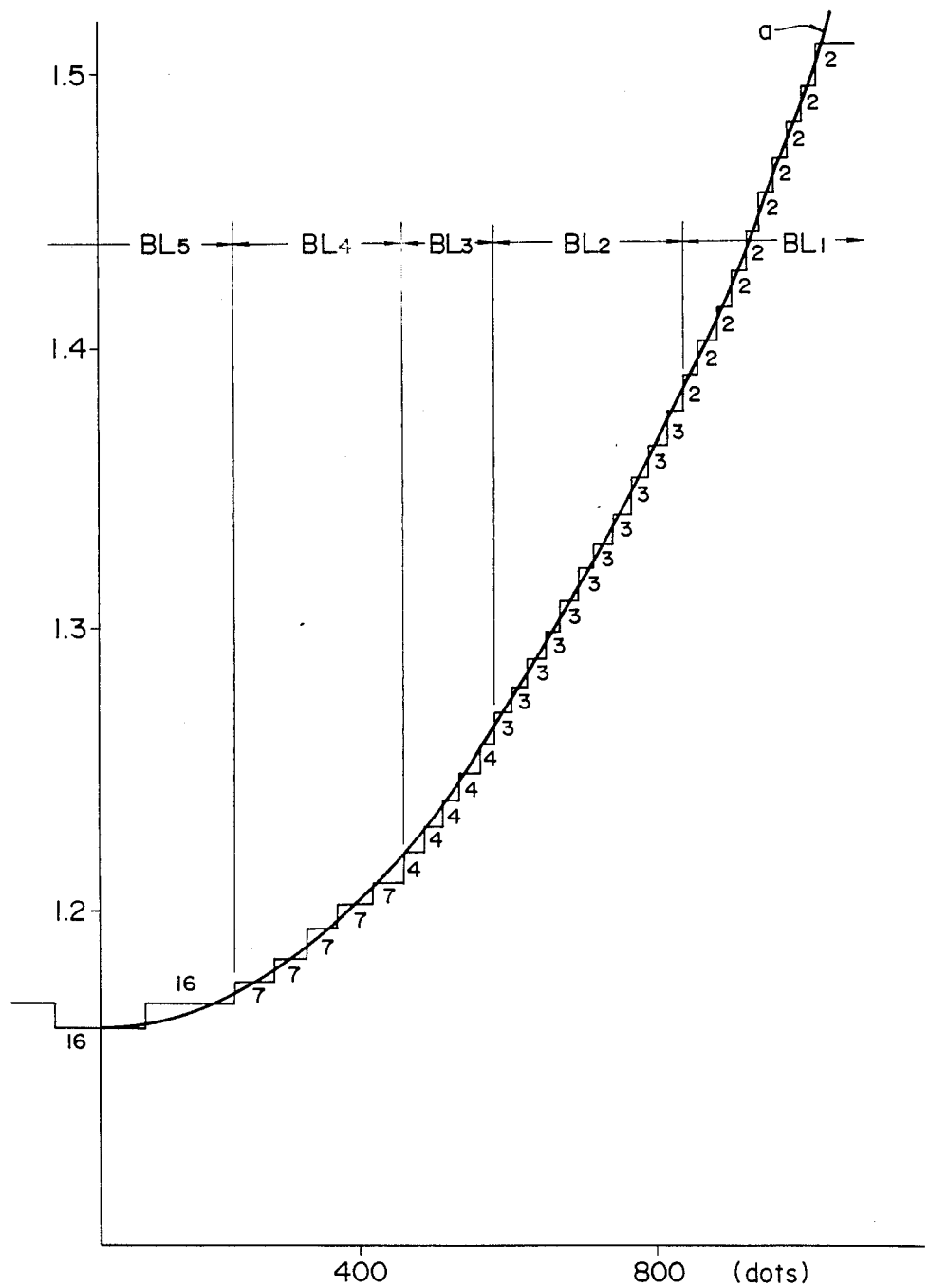

At the same time, the frequency division ratio setting circuits 236 and 238 change the frequency division ratioes Ni and Mi in accordance with the write mode signal, i.e., pixel density information and the line speed information. For the case in which use is made of the polygon mirror 106 having a mirror surface or facet which is curved as defined by a circle having a center at point C and a length A between the rotating axis O and each mirror surface (in this case, a deflection angle 28 for rotating angle alpha is given by sin $\theta = 1 - A/R \cdot \sin$ alpha) as shown in FIG. 14, one example of a relationship among the number of blocks in the pixel density at 300 DPI, 240 DPI, count number (frequency division ratio Mi) of clock $f_M$, steps of frequency division ratio Ni, and position controlling clock $f_N$ is illustrated in FIGS. 15 and 16. In each of FIGS. 15 and 16, the right-hand end indicates the scan start end and only the right-hand half of a symmetrical characteristic curve is illustrated.

That is, in the case of 300 DPI, as shown in FIG. 15, the scanning region is divided into seven blocks, i.e., first block $BL_1$ through seventh block $BL_7$. And, in the first block $BL_1$ (same for the seventh block $BL_7$), every time when the position controlling clock $f_N$ has been counted to five (i.e., Mi=5), the frequency division ratio Ni is switched up to six steps in a stepwise fashion (ni=6). In the second block $BL_2$ (same for the sixth block $BL_6$), every time when the position controlling clock $f_N$ has been counted to six (i.e., Mi=6), the frequency division ratio Ni is switched up to nine steps (ni=9) in a stepwise fashion. In the third block $BL_3$ (same for the fifth block $BL_5$), every time when the position controlling clock $f_N$ has been counted to 10 (i.e., Mi=10), the frequency division ratio Ni is switched up to three steps (ni=3) in a stepwise fashion. In the fourth block $BL_4$, every time when the position controlling clock $f_N$ has been counted to 16 (i.e., Mi=16), the frequency division ratio Ni is switched up to five steps (Ni=5) in a stepwise fashion.

In the case of 240 DPI, as shown in FIG. 16, the scanning region is divided into nine blocks, i.e., first block $BL_1$ through ninth block $BL_9$. And, in the first block $BL_1$ (same for the ninth block $BL_9$), every time when the position controlling clock $f_N$ has counted to two (i.e., Mi=2, the frequency division ratio Ni is switched up to 10 steps (ni=10) in a stepwise fashion. In the second block $BL_2$ (same for the eighth block $BL_8$), every time when the position controlling clock $f_N$ has counted to three (i.e., Mi=3, the frequency division ratio Ni is switched up to eleven steps (ni=11) in a stepwise fashion. In the third block $BL_3$ (same for the seventh block $BL_7$), every time when the position controlling clock $f_N$ has counted to four (i.e., Mi=4), the frequency division ratio Ni is switched up to five steps (ni=5) in a stepwise fashion. In the fourth block $BL_4$ (same for the sixth block $BL_6$), every time when the position controlling clock $f_N$ has counted to seven (i.e., Mi=7, the frequency division ratio Ni is switched up to five steps (ni=5) in a stepwise fashion. In the fifth block $BL_5$, every time when the position controlling clock $f_N$ has counted to sixteen (i.e., Mi =16), the frequency division ratio Ni is switched up to three steps (ni=3) in a stepwise fashion.

With such a structure, there can be obtained changes in the position controlling clock $f_N$ which approximates the ideal changes in the pixel clock WCLK indicated by the continuous curve a. Thus, although the frequency of the position controlling clock $f_N$ changes in a stepwise fashion, the frequency $f_K$ of the actual pixel clock WCLK changes continuously due to the function of the PLL to thereby produce an ideal pixel clock. Thus, as shown in FIGS. 17a through 17g, the frequency division ratio setting circuits 236 and 238 are initialized at the timing of the sync detection signal DETP shown in FIG. 17a. And, the enable signal shown in FIG. 17g from the modulating operation management circuit 243 is supplied to the frequency modulating counter 241 at the timing when a predetermined time period Ta has elapsed from the occurrence of the sync detection signal DETP, whereby the frequency modulating counter 241 is set in an enable state. Then, when a predetermined time period Tb has elapsed subsequent to the scanning time period T, the outputting of the enable signal from the modulating operation management circuit 243 is terminated, so that the frequency modulating counter 241 is set in a disable state, whereby the frequency division ratio is fixed at an initial value.

Figure 17:
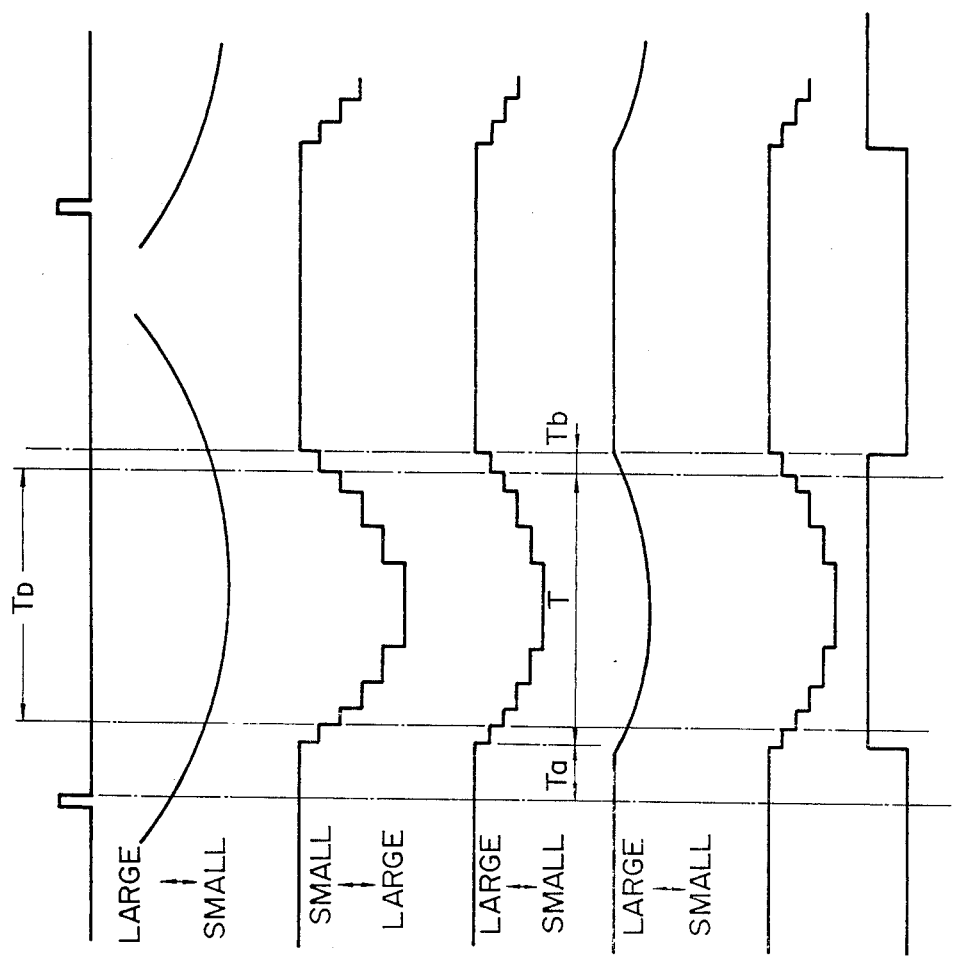

In this case, the frequency division ratio Ni changes as shown in FIG. 17c and the frequency $f_O/Ni$ of the position controlling clock $f_N$ changes as shown in FIG. 17d, so that the frequency $f_K$ of the pixel clock WCLK changes as shown in FIG. 17e, which corresponds to changes in the scanning speed shown in FIG. 17b.

Now, in the case where the frequency $f_K$ of the pixel clock WCLK is changed, since this frequency is an inverse of the time period T allocated for writing of one pixel, the time period T also changes in accordance with changes in the frequency $f_K$. And, in this case, if the light intensity of the scanning light (scanning beam) is at constant, the light energy per pixel differs between the point where the scanning speed is large but the time period T is short and the point where the scanning speed is small but the time period T is long, so that there could be produced irregularities in image density of a written image. For this reason, it is so structured to change the output (intensity of emitted light) of the laser diode 210 in accordance with the frequency $f_K$ of the pixel clock WCLK.

Figure 18:
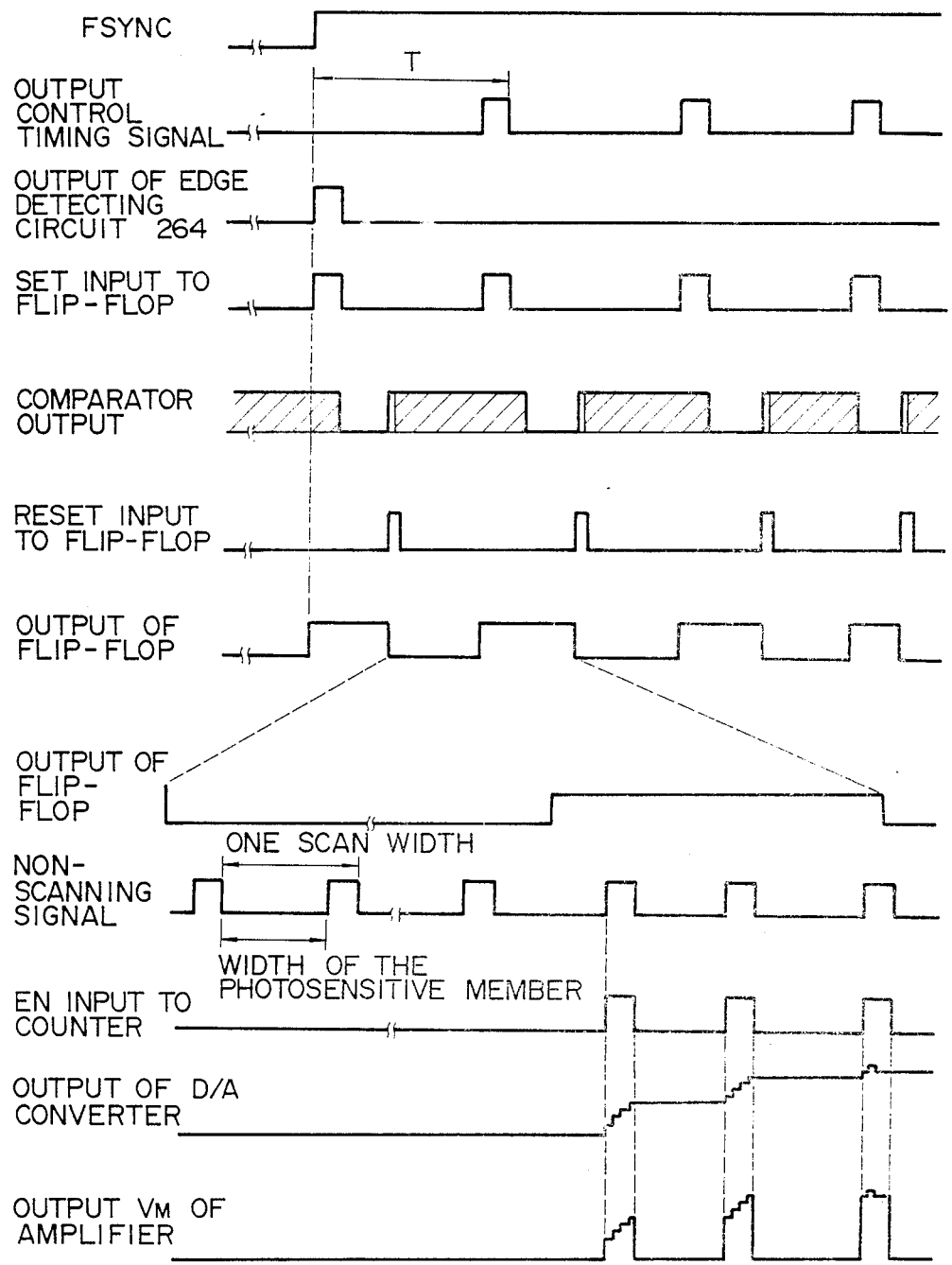

It will now be described as to the operation for controlling the intensity of the light emitted from the laser diode (LD) 210. In the first place, the operation for setting the intensity of the light emitted from the laser diode 210 at a reference value will be described with particular reference to FIGS. 12 and 18. The laser light emitted rearwardly of the laser diode 210 is received by the monitoring photodiode 211 which outputs current in accordance with the intensity of the laser light, i.e., the amount of laser light received. And, the current thus output is amplified by an amplifier 261 and at the same time changed to a voltage $V_M$ which, in turn, is input into the comparator 262 for comparison with the reference value $V_{REF}$. And, if the result of comparison at the comparator 262 indicates that $V_M$ is smaller than $V_{REF}$, the up/down counter 270 is set in the upcount mode; whereas, if the result of comparison indicates that $V_M$ is larger than or equal to $V_{REF}$, the up/down counter 270 is set in the downcount mode.

On the other hand, the rising edge of the frame sync signal FSYNC is detected by an edge detecting circuit 264, and a logical product between this edge detection signal and the frame sync signal FSYNC is determined at the AND circuit 266, and the flip-flop 268 is set by the output from the AND circuit 266 at the beginning of the stand-by mode, thereby causing the output from the Q terminal of the flip-flop 268 to be set at high level "H". Thus, a logical product between this Q output and the non-scanning signal is determined at the AND circuit 269, so that, if the non-scanning signal is input with the Q output at high level "H", an enable signal EN is output to the up/down counter 270. With this, the up/down counter 270 upcounts or downcounts the clock. And, the reference value data which is the count value of this up/down counter 270 is subjected to digital-to-analog conversion by the D/A converter 215 to thereby become an analog reference value signal, which is then supplied to the LD driver circuit 217 through the adder 252. Thus, the LD driver circuit 217 supplies driver current to the laser diode 210 in accordance with the reference value signal. Accordingly, as the count value of the up/down counter 270 increases, the intensity of the light emitted from the laser diode 210 increases; whereas, as the count value of the up/down counter 270 decreases, the intensity of the laser diode 210 decreases.

When the magnitude relationship between the voltage $V_M$ and the reference value $V_{REF}$ has been reversed due to the change of the voltage $V_M$ depending on the output from the photodiode 211 in accordance with the change of the intensity of the light emitted from the laser diode 210, the up/down signal from the comparator 262 is inverted. When the rising or falling edge of the up/down signal from the comparator 262 is detected by the edge detecting circuit 263, a reset signal is input into the flip-flop 268, so that the output from the terminal Q of the flip-flop 268 becomes low level "L". As a result, the outputting of an enable signal EN to the up/down counter 270 is terminated, so that the up/down counter 270 is disabled to thereby hold the count value of the comparator 262 at the time when the output has been inverted. Thus, the intensity of the light emitted from the laser diode 210 is held at a reference intensity corresponding to the reference value $V_{REF}$.

It may also be so structured that the edge detecting circuit 263 disables the up/down counter 270 only when the output of the comparator 262 changes from low level "L" to high level "H." In this case, the above-described explanation applies when the output of the comparator 262 changes from high level "H" to low level "L"; however, the up/down counter 270 operates as an upcounter with the disabled state released when the output of the comparator 262 changes from low level "L" to high level "H", so that the intensity of the light emitted from the laser diode 210 increases. And, when the output of the comparator 262 changes from low level "L" to high level "H", the up/down counter 270 is disabled to hold its count value.

It may also be so structured that the up/down counter 270 operates as an upcounter when the output from the comparator 262 is at low level "L" and as a downcounter when the output from the comparator 262 is at high level "H", whereby the count value is inversely proportional to drive current of the laser diode 210.

And, when scanning the photosensitive member 21, the non-scanning signal becomes low level "L" to thereby disable the up/down counter 270. The up/down counter 270 is not driven during scanning in the stand-by state, and is interrupted if the output setting of the laser diode 210 is incomplete with the output setting being resumed upon entering the non-scanning mode.

In the case where the output of the laser diode 210 is to be set at the reference value as described above, if the laser diode 210 deteriorates, the intensity of emitted light does not change no matter how much driver current has been changed. Thus, although the counter value of the up/down counter 270 has counted up to "$FF_H$" or "$00_H$", the output of the comparator 262 is not inverted. In this case, the up/down counter 270 again starts counting from the initial value, and due to this count up, a carry signal or borrow signal is output, and this signal is applied to the light-emitting diode 271. Thus, when the laser diode 210 has deteriorated, the light-emitting diode 271 continues flashing, so that the occurrence of deterioration of the laser diode 210 can be detected easily. In addition, the correction value for intensity modulation from the intensity modulating up/down counter 240 is set at "0" positively by the mode setting signal MD from the flip-flop 268, thereby preventing the reference value setting from being influenced.

Next, a description will be had as to the correction of the output (intensity of emitted light) from the laser diode 210 in accordance with the change in the frequency $f_K$ of the pixel clock WCLK. Similarly with the frequency modulating up/down counter 241 used for switching the frequency of the pixel clock WCLK as described above, the intensity modulating up/down counter 240 receives the clock $f_M$ from the frequency divider 237 and its count mode is switched depending on the up/down switching signal U/D output from the up/down switching circuit 242 based on the count value of the frequency modulating up/down counter 241, whereby its operation is controlled depending on an enable signal EN from the modulating operation management circuit 244. That is, in the present embodiment, it is divided between the intensity modulating up/down counter 240 and the frequency modulating up/down counter 241; however, a single up/down counter may be shared.

Accordingly, the variation in the count value obtained by counting the clock $f_M$ from the frequency divider 237 due to the intensity modulating up/down counter 240 becomes equal to the variation in the count value of the frequency modulating up/down counter 241, and the count value of the counter 240 is output to the D/A converter 216 as a correction data, whereby it is converted into a correction signal. That is, the correction data output from the intensity modulating up/down counter 240 varies in a stepwise fashion as shown in FIG. 17f in accordance with the scanning speed shown in FIG. 17b, and, thus, the correction signal output from the D/A converter 216 as a result of subjecting the correction data to D/A conversion also varies in accordance with the scanning speed. Under the condition, the correction signal from the D/A converter 216 is added to the reference value signal from the before-mentioned D/A converter 215, and this added value is input into the LD driver circuit 217 as an emitting light intensity signal, so that the driver current supplied from the LD driver circuit 217 to the laser diode 210 has a current value in accordance with the scanning speed. As a result, the intensity of the light emitted from the laser diode 210 varies in accordance with the scanning speed.

With the above-described structure, even if the frequency $f_K$ of the pixel clock WCLK changes, the amount of light per pixel may be set substantially at constant, so that irregularities in image density may be suppressed. Incidentally, the arithmetic between the correction signal from the D/A converter 216 and the reference value signal from the D/A converter 215 may be carried out as addition or multiplication in the case where the correction signal is proportional to the variation of the scanning speed (as in the above-described case) to thereby produce an emitting light intensity signal; whereas, if the correction signal is inversely proportional to the variation of the scanning speed, the arithmetic can be carried out as subtraction or division to thereby produce an emitting light intensity signal.

As described above, in accordance with the present embodiment, since the frequency $f_K$ of the pixel clock WCLK is varied in accordance with the pixel density or line speed, by providing a plurality of kinds of delay elements 223 of the modulating circuit 218 and arranging them to be switched by switching means, if desired, the on/off ratio of a light source within one pixel can be enhanced by switching the delay elements 223 in accordance with the pixel density or line speed. Thus, in accordance with the present invention, the pixel density can be varied suitably.

While the above provides a full and complete disclosure of the preferred embodiments of the present invention, various modifications, alternate constructions and equivalents may be employed without departing from the true spirit and scope of the invention. For example, the present invention has been described as to the case in which it has been applied to a laser printer; however, the present invention may also be applied to any other image forming apparatuses, such as copying machines, facsimile machines, and printing machines. Therefore, the above description and illustration should not be construed as limiting the scope of the invention, which is defined by the appended claims.

What is claimed is:

1. An image forming apparatus, comprising:
   emitting means for emitting a light beam which may be modulated with image information to be written;
   deflecting means for deflecting said light beam emitted from said emitting means over a predetermined angle repetitively;
   an imaging member for receiving said light beam deflected by said deflecting means, whereby said deflected light beam scans said imaging member to thereby define an image on said imaging member; and
   controlling means for controlling the overall operation of said apparatus, said controlling means including pixel density switching means for switching an image density in accordance with input pixel density information,
   wherein said pixel density switching means changes a frequency of a pixel clock used in said apparatus in accordance with a pixel density or line speed.

2. The apparatus of claim 1 further comprising a first optical system for leading said light beam emitted from said emitting means to said deflecting means and a second optical system for leading said light beam deflected by said deflecting means onto said imaging member, whereby a first light path defined by said first optical system and a second optical path defined by said second optical system cross each other at different elevations at least partly.

3. The apparatus of claim 2 wherein said first optical system includes a first cylindrical lens for passing said light beam emitted from said emittitng means, a first mirror for reflecting said light beam passing through said first cylindrical lens and a spherical lens for focusing said light beam reflecting from said first mirror onto said deflecting means.

4. The apparatus of claim 3 wherein said second optical system includes a second mirror for reflecting said light beam deflected by said deflecting means and a second cylindrical lens for passing said light beam reflecting from said second mirror toward said imaging member.

5. The apparatus of claim 4 wherein said deflecting means includes a polygon mirror having a plurality of mirror surfaces and rotating means for rotating said polygon mirror in a predetermined direction at constant speed.

6. The apparatus of claim 5 wherein said imaging member is a photosensitive drum which is driven to rotate in a predetermined direction at constant speed.

7. The apparatus of claim 5 further comprising a third mirror disposed at a position outside of a portion of said predetermined angle of deflection which determines a scanning width of said scanning light beam on said imaging member for receiving said light beam deflected by said deflecting means to produce a sync signal.

8. The apparatus of claim 1 wherein said apparatus is connected to a host system from which said image information is supplied and said pixel density information is supplied from said host system.

9. The apparatus of claim 1 further comprising setting means for setting a pixel density.

10. The apparatus of claim 9 wherein said setting means includes a pixel density setting terminal and a jumper for connecting said terminal to a reference potential, whereby a first pixel density is set when said terminal is connected to said reference potental by said jumper and a second pixel density is set when said terminal is disconnected from said reference potential.

11. The apparatus of claim 9 wherein said setting means includes a pixel density setting terminal and a dip switch connected to said terminal for varibaly setting a potential level at said termial, whereby a pixel density is set depending on the potential level set at said terminal.

* * * * *